J. G. LEYNER.
ENDLESS AUTOMATIC TRACK LAYING AND GROUND TREADING POWER OPERATED TRACTION ENGINE.
APPLICATION FILED JULY 28, 1915.
1,254,819.
Patented Jan. 29, 1918.
11 SHEETS—SHEET 3.
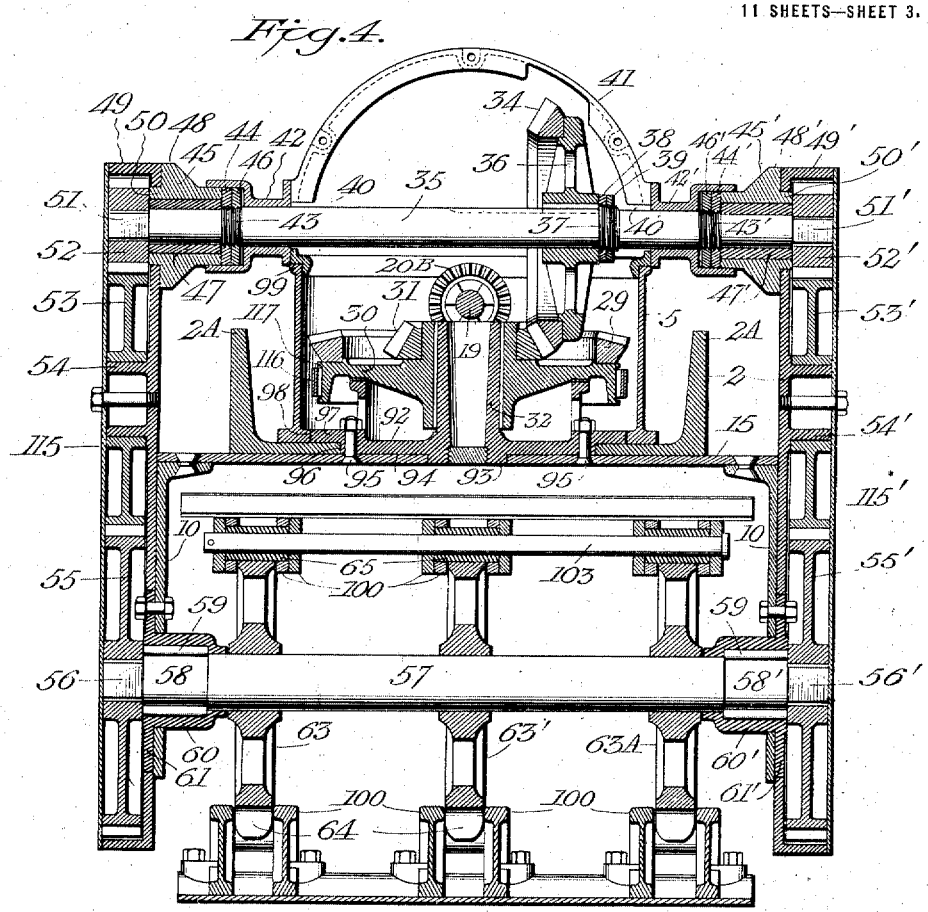
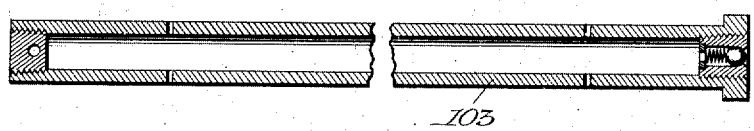

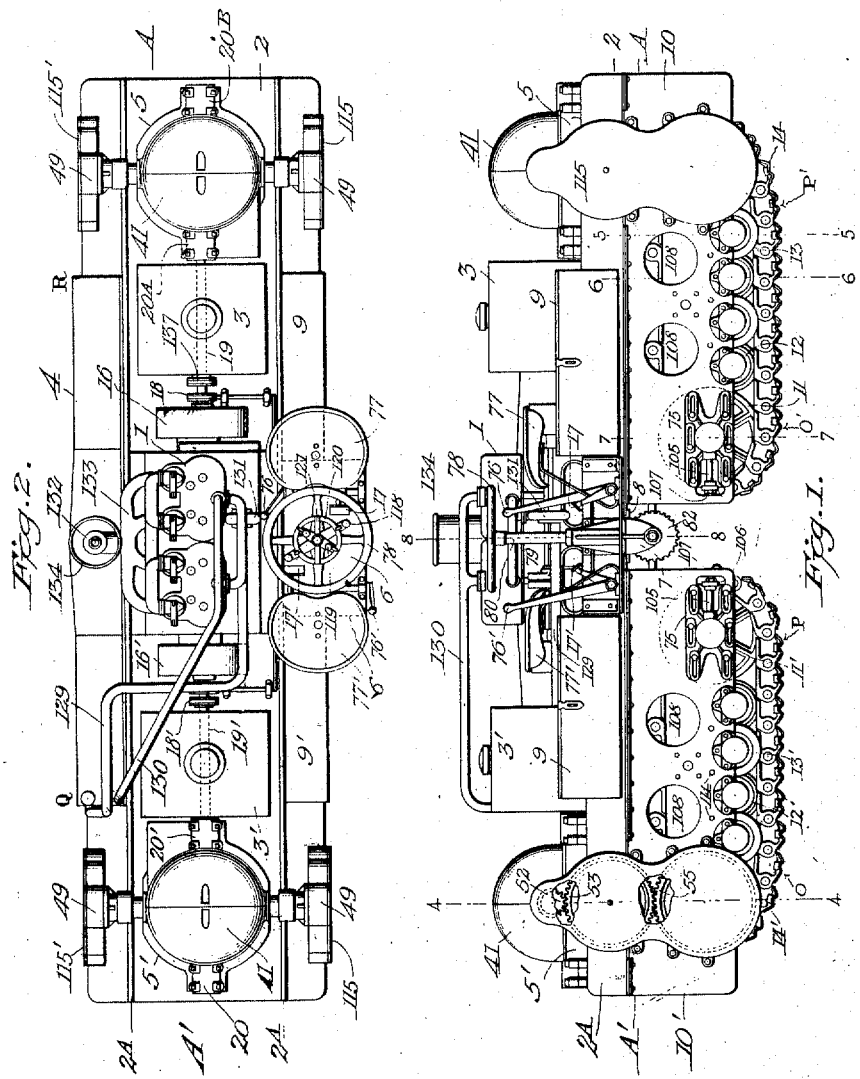

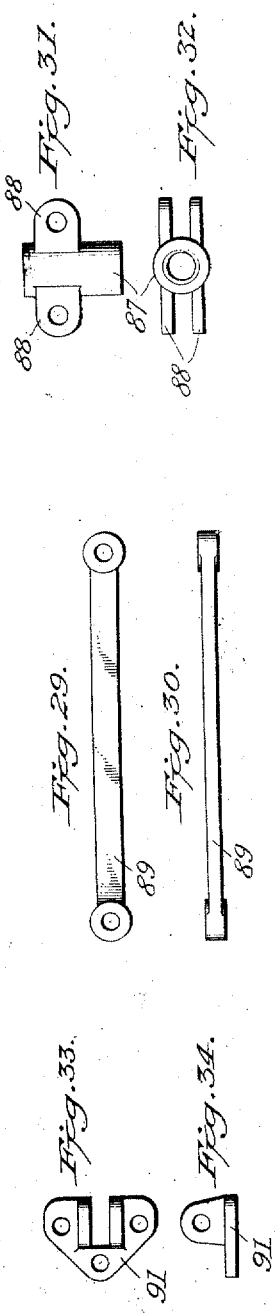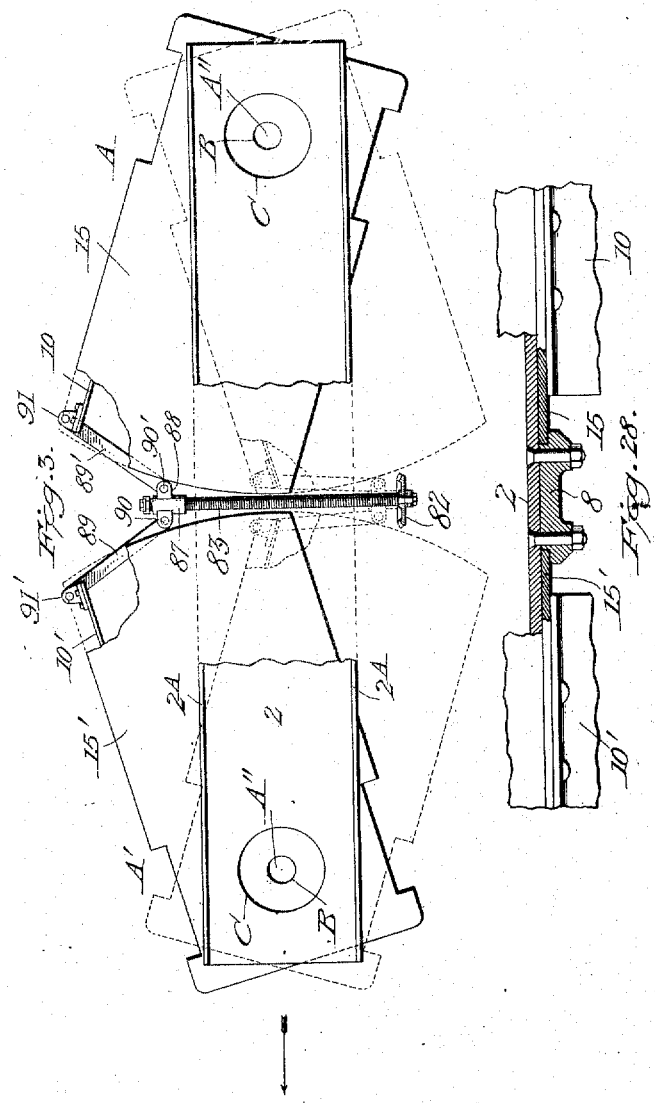

J. G. LEYNER.
ENDLESS AUTOMATIC TRACK LAYING AND GROUND TREADING POWER OPERATED TRACTION ENGINE.
APPLICATION FILED JULY 28, 1915.
1,254,819.
Patented Jan. 29, 1918.
11 SHEETS—SHEET 5.
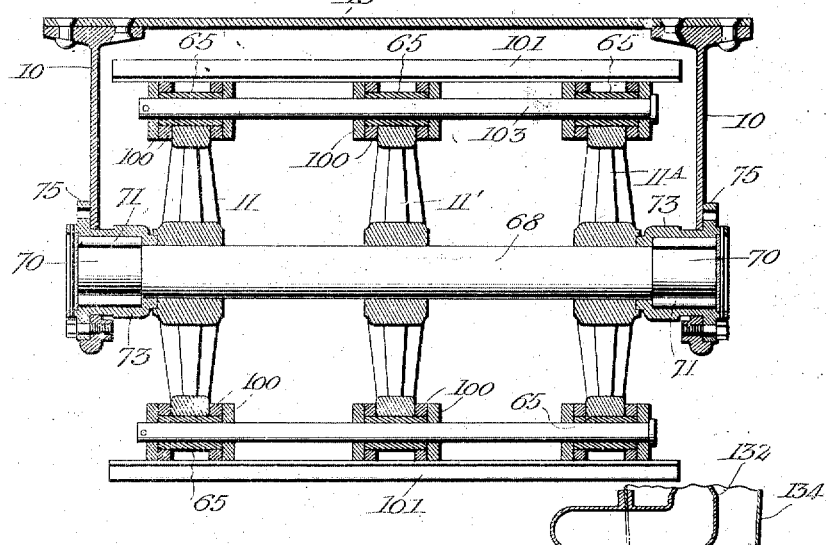
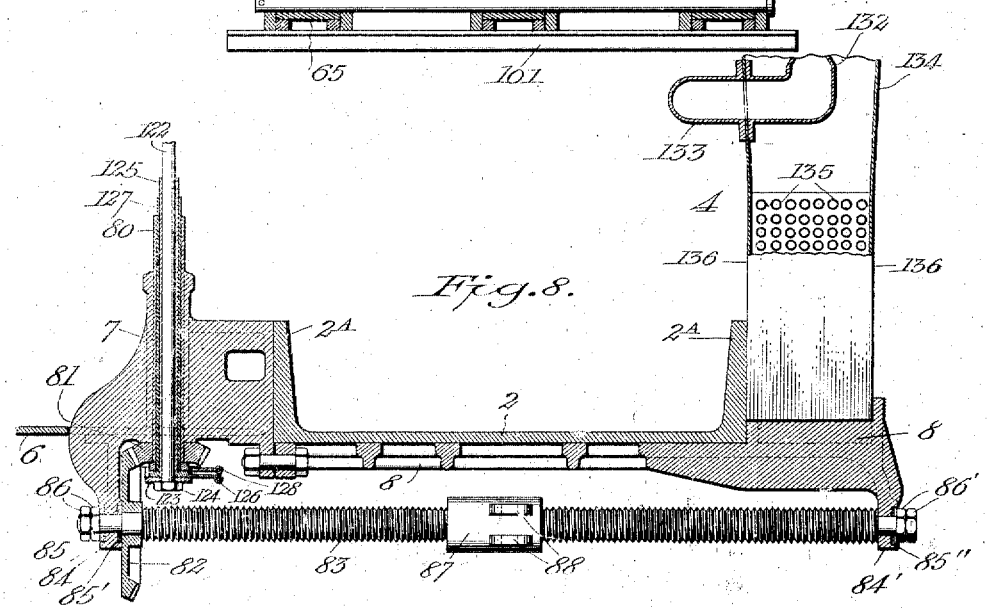
Witnesses
G. Sargent Elliott
Adella M. Fowle
Inventor:
John George Leyner,
By H. S. Bailey, Attorney.

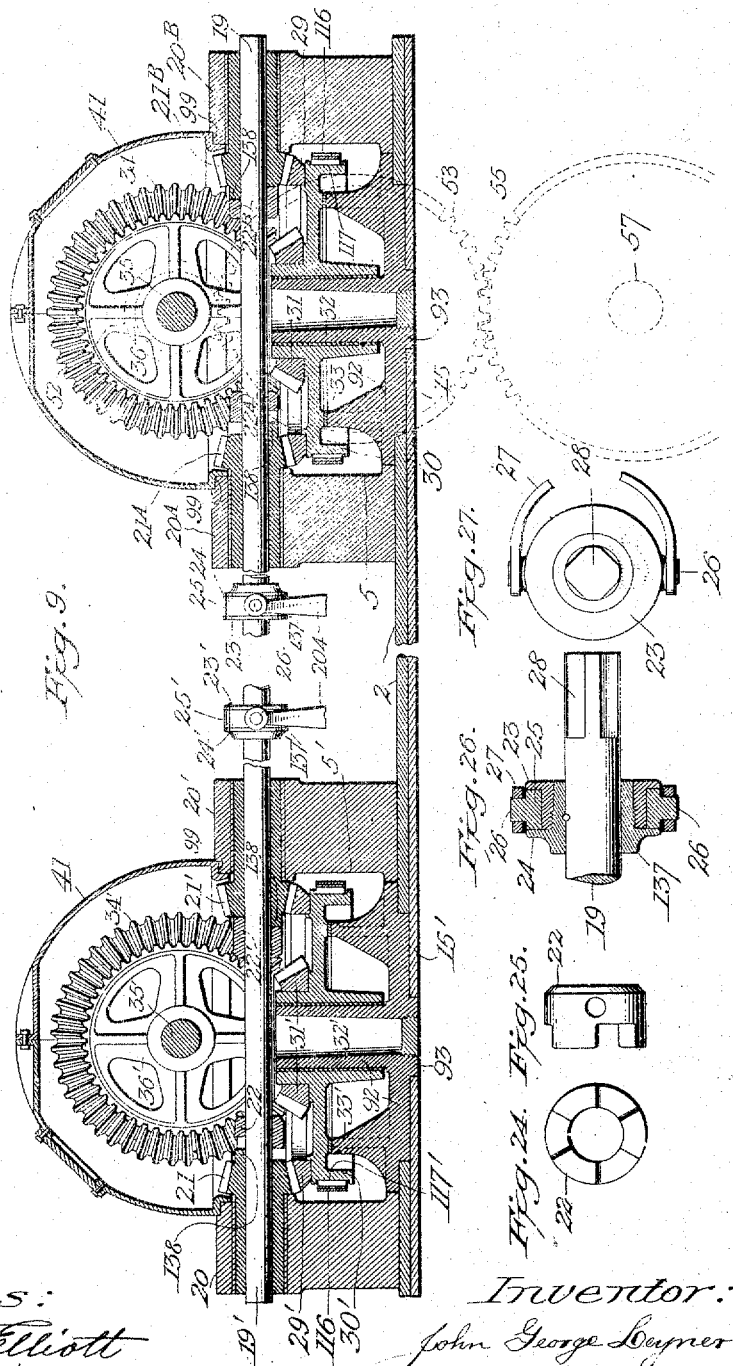

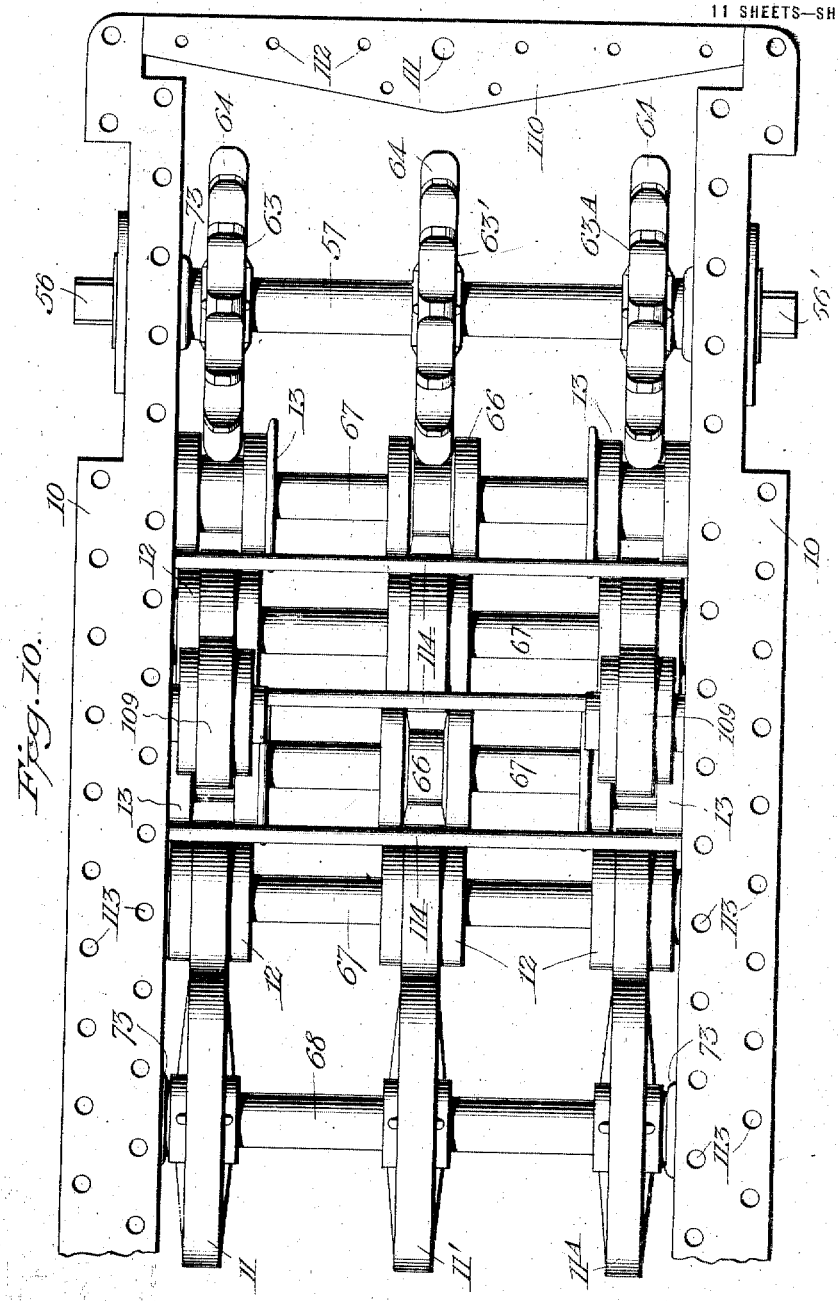

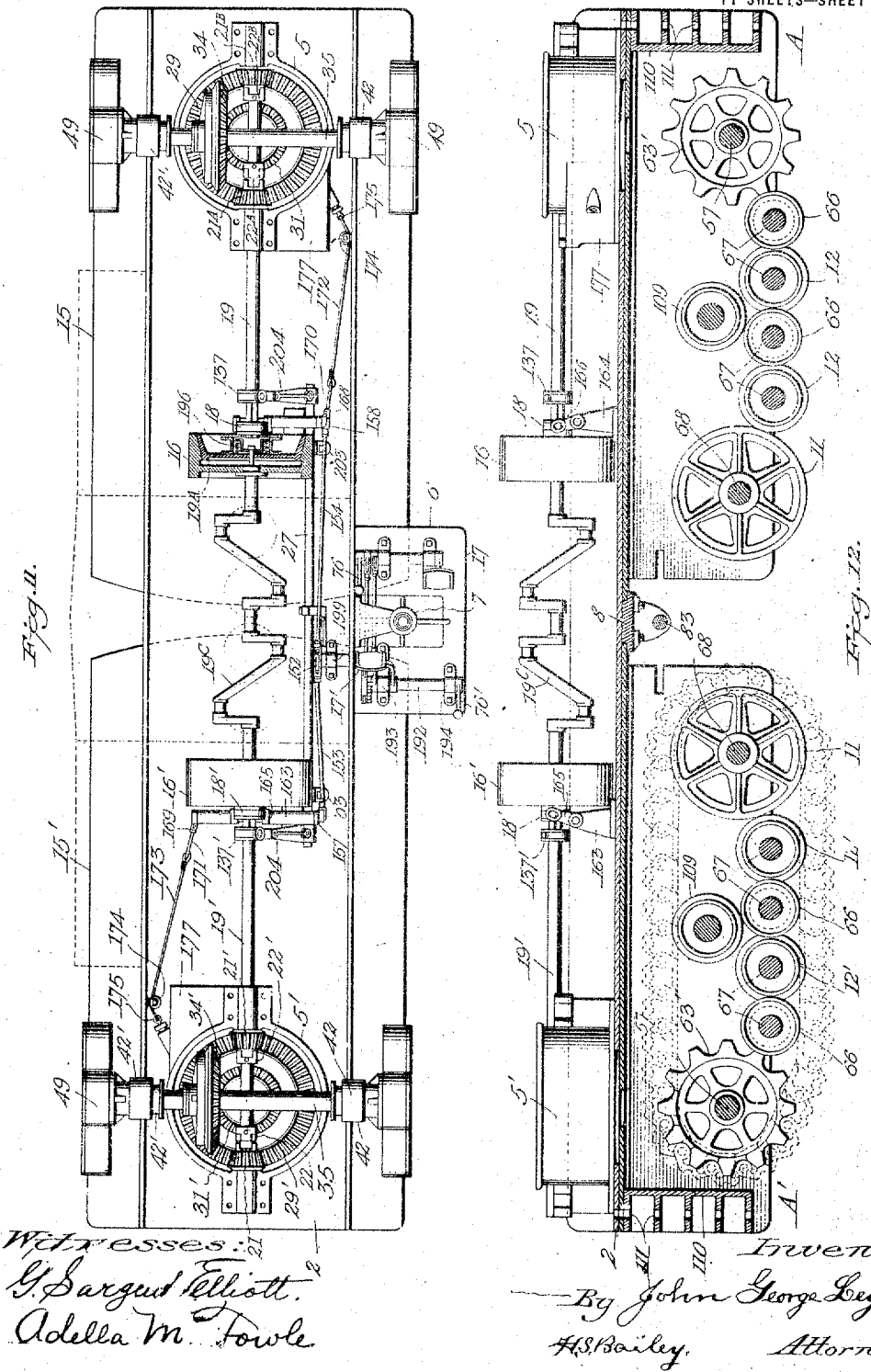

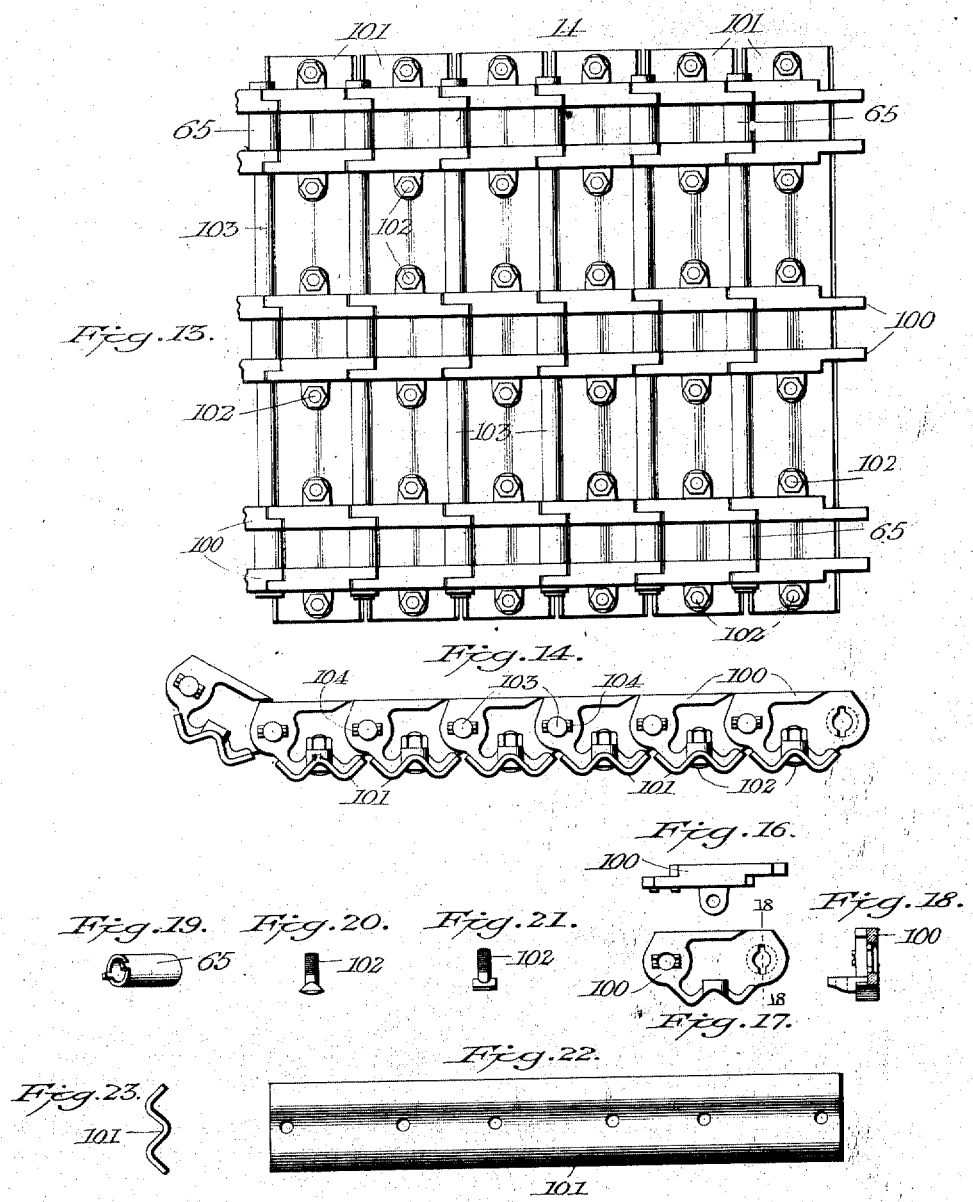

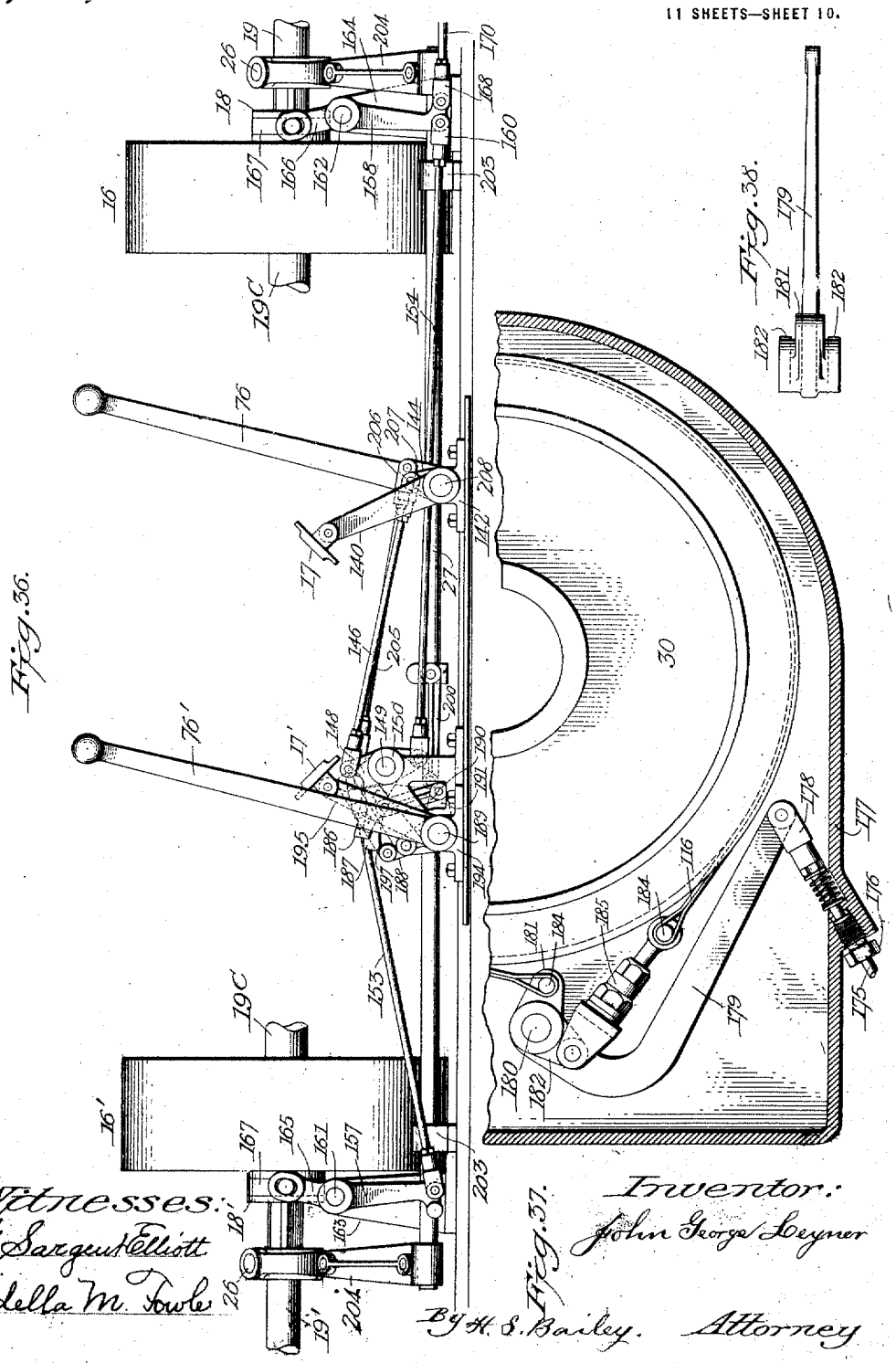

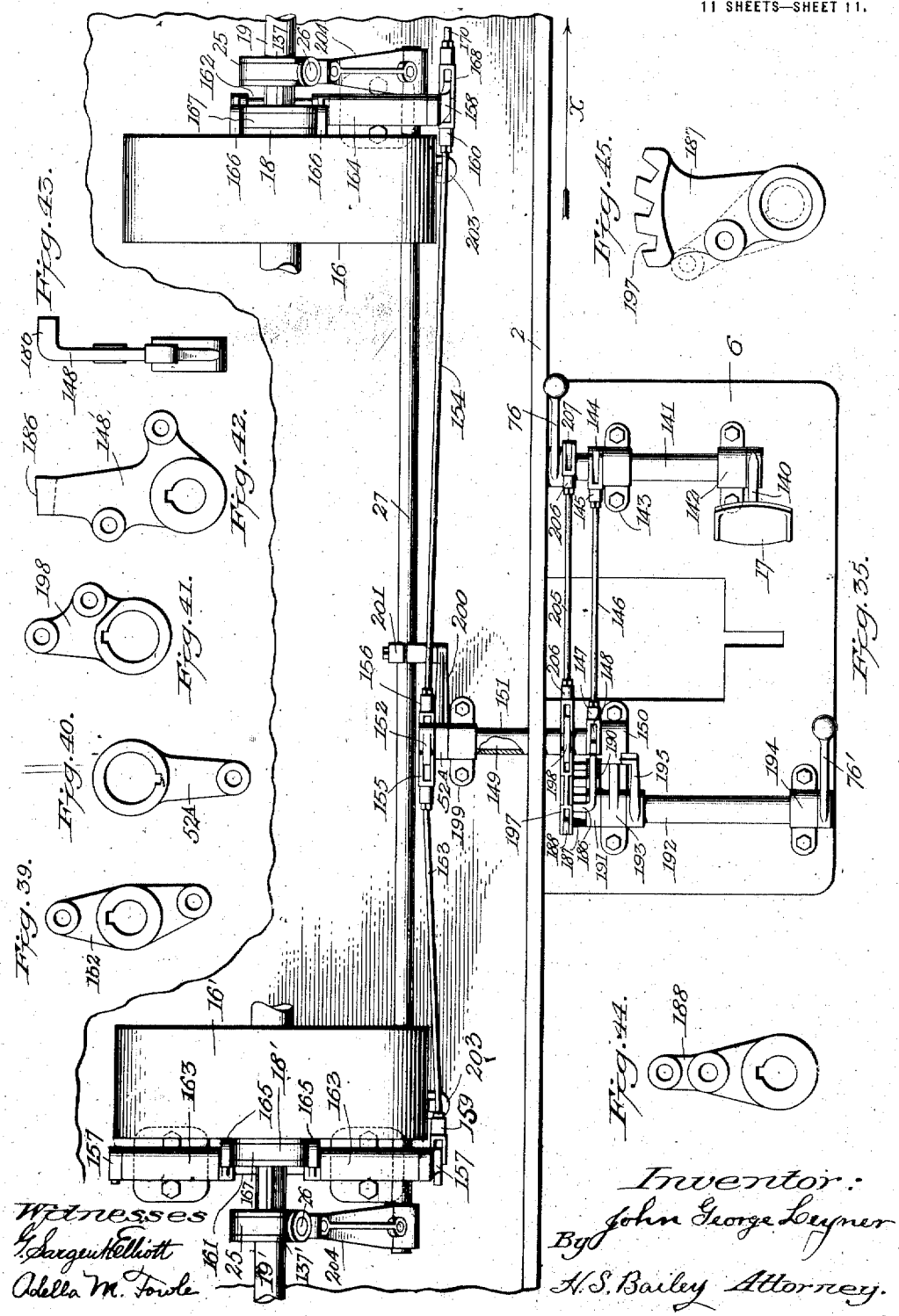

UNITED STATES PATENT OFFICE.

JOHN GEORGE LEYNER, OF LARKSPUR, COLORADO.

ENDLESS AUTOMATIC TRACK-LAYING AND GROUND-TREADING POWER-OPERATED TRACTION-ENGINE.

1,254,819.

Specification of Letters Patent.

Patented Jan. 29, 1918.

Application filed July 28, 1915. Serial No. 42,274.

*To all whom it may concern:*

Be it known that I, JOHN GEORGE LEYNER, a citizen of the United States of America, residing at Larkspur, county of Douglas, and State of Colorado, have invented a new and useful Endless Automatic Track-Laying and Ground - Treading Power - Operated Traction-Engine, of which the following is a specification.

My invention relates to a new type of endless automatic track laying and ground treading power operated traction engine for use in pulling plows and in operating other agricultural machinery, and for general haulage purposes on roads and fields, and the objects of my invention are:

First, to provide a traction engine in which two independently mounted ground treading endless traction members are arranged in end to end tandem order and are adapted to be swung in synchronous unison to steeringly turn the tractor in any desired predetermined direction in turning corners or to completely turn the tractor around end for end in circular directions.

Second, to provide a ground treading endless track type of traction engine in which two independently mounted and separated endless tracks are arranged to be swung laterally in horizontal planes underneath the supported frame from either side of the longitudinal center of said frame in such relative unison of angular movement and position as to turn the supported frame and consequently the tractor in any desired direction in predetermined portions of circles.

Third, to provide a tractor which is arranged with two seats adjacent to each other, facing in opposite directions and also facing each other, arranged to permit the operator to quickly change seats when he reverses the direction in which the tractor is moving, thus enabling him to always face the direction in which the tractor is moving; thus in backing in the field or on the road, the operator can in an instant change his seat to face the direction he wishes to back the tractor in.

Fourth, to provide an endless track type of ground treading traction engine in which the area of ground engaged by the track is very greatly increased over the wheel supported and running type of tractors and in which practically all of the motive power of the motor of the tractor is applied to the ground treading endless tracks as live load drawing power.

Fifth, to provide an endless track type of traction engine in which a larger area of ground treading surface and consequently of load drawing power, can be secured in a machine of substantially the same length but of less width than other types of track or wheel tractor engines at present in use.

Sixth, to provide a ground treading endless track type of tractor engine in which a duplicate system of motive power control is provided and adapted to adjacently arranged and opposing seats that face in opposite directions and that are arranged to enable the operator to control, drive ahead, steer, and reverse the tractor and turn it in either direction by changing his position from one seat to the other; thus enabling him to always face the direction the tractor is moving when he reverses the direction of its movement. And Seventh, to provide a simple, positively operating, steering and turning mechanism, and a strong and durable and easily operated power operated tractor of simple and reliable construction.

I attain these objects by the mechanism illustrated in the accompanying drawings, in which:

Figure 1, is a view in side elevation of an engine embodying features of the invention.

Fig. 2, is a plan view thereof.

Fig. 3, is a plan view of same, with motor and superstructure removed, portions of parts being broken away, and other parts being shown in section.

Fig. 4, is a vertical transverse section through the tractor upon the line 4—4 of Fig. 1.

Fig. 7, is a vertical transverse section through the line 7—7 of Fig. 1.

Fig. 8, is a vertical transverse section upon the line 8—8 of Fig. 1, with portions removed, and other portions broken away.

Fig. 9, is a central vertical section along the longitudinal axis of the tractor with portions removed and other portions broken away.

Fig. 10, is a detail plan view of one of the track frames drawn to a larger scale, and with portions removed.

Fig. 11, is a plan view of the tractor with parts removed, illustrating the manner of operating the fly wheel clutches, also the manner of shifting the driving shafts endwise to reverse the direction of the machine.

Fig. 12, is a longitudinal, vertical sectional view of the tractor, showing the arrangement of the wheels for operating and supporting the endless tracks, parts of the machine being omitted.

Fig. 13, is a plan view of a portion of one of the endless tracks.

Fig. 14, is a side view of the same.

Fig. 15, is a longitudinal sectional view of one of the pins which connect the alined pairs of the endless track links.

Fig. 16, is a plan view of one of the track links.

Fig. 17, is a side view of the same.

Fig. 18, is a vertical sectional view on the line 18—18 of Fig. 17.

Fig. 19, is a perspective view of one of the sleeves one of which is contained within the inset ends of each pair of links.

Fig. 20, is a side view of one of the bolts which connect the links to the track plates looking endwise at its head.

Fig. 21, is also a side view of the bolt looking sidewise at its head.

Fig. 22, is a bottom view of one of the tie plates.

Fig. 23, is an end view of the same.

Fig. 24, is a front view of one of the gear clutch collars which are rigidly mounted upon the driving shafts.

Fig. 25, is a side view of the same.

Fig. 26, is a sectional view showing the manner of connecting the reversing bar to the driving shafts.

Fig. 27, is an end view of the parts shown in Fig. 26.

Fig. 28, is a vertical, longitudinal sectional view through a portion of the main frame, showing the driving track frame guide rail which supports the inner ends of the driving track frame top plates.

Figs. 29 and 30 show respectively a side and edge view of one of the links which connect the steering nut with the driving track frame.

Figs. 31 and 32 are respectively a plan and an end view of the steering nut.

Figs. 33 and 34 are respectively a plan and a side view of one of the castings which are secured to the inner ends of the track frame, to which are secured the outer ends of the links shown in Figs. 29 and 30.

Fig. 35 is an enlarged plan view illustrating the foot and hand levers and mechanism connected therewith for operating the driving shafts and the fly wheel-operated clutches.

Fig. 36 is a front elevation of the mechanism shown in Fig. 35.

Fig. 37 is an enlarged fragmental sectional plan view illustrating a portion of one of the castings which receive the brake band, and its housing, and the actuating lever for applying the brake band.

Fig. 38 is an edge view of the brake lever shown in Fig. 37. And

Figs. 39, 40, 41, 42, 43, 44 and 45, are views of various crank arms forming part of the clutch and driving shaft operating mechanism.

Similar letters and figures of reference refer to similar parts throughout the several views.

Figure 5:
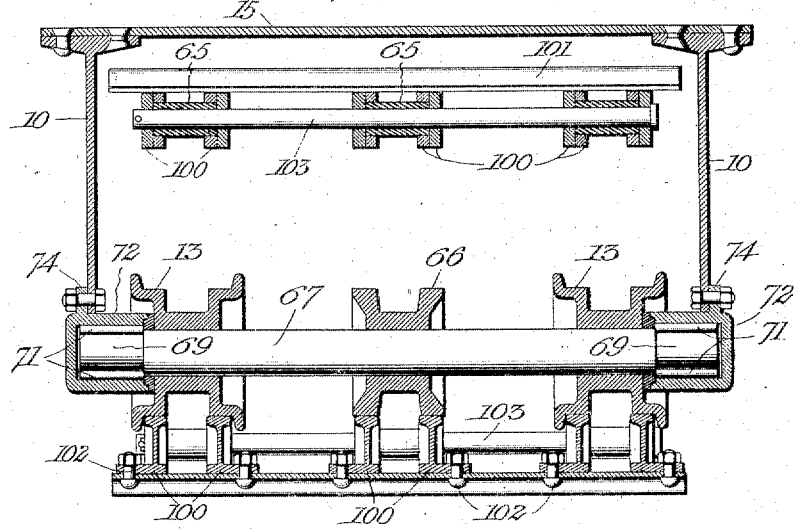
Fig. 5, is a vertical transverse section through the line 5—5 of Fig. 1.

My invention contemplates broadly a power operating traction engine that can be propelled and operated by gas, steam, electricity or any other type of motive power producing engine or engines. I have however preferably embodied and illustrated in the drawings of this present application as the propelling and operating motor of my tractor, an internal combustion engine 1, which with its coöperating elements will be fully described hereinafter.

My automatic endless track laying and ground treading tractor comprises a stationary mechanism supporting platform plate member 2, which preferably consists of an iron or steel channel shaped plate member, having a wide central flat plate portion and upwardly projecting side flange portions 2^A. The plate portion of this channeled member lies in a flat horizontal position and forms the upper or top supporting platform of a number of the parts of the tractor. This channeled plate 2 I term the stationary platform frame of the tractor, as it is a stationary frame. It is made in one continuous piece and it has mounted on it the fuel tanks 3 and 3', the horizontal multi-tubular radiator 4, the bevel reduction gear housings 5 and 5', the operating platform 6, the steering post casting 7, the driving track frame guide rail 8, and the tool boxes 9 and 9'. This main frame 2 rests on plates 15 and 15' which are supported by T beams 10 and 10' which rest on and are secured to journal boxes that are mounted on the opposite ends of the shafts upon which the endless ground treading tracks 14 and 14' are mounted and secured. The flat horizontal plates 15 and 15', the vertical T beams 10 and 10', and the shafts and wheels thereof constitute the endless ground treading tractor propelling track frames A and A' of which there are two, one at each end portion of the stationary top platform frame 2, as shown in Fig. 1. These driving track supporting frames are pivotally connected to the underside of the stationary platform frame 2, in such a manner that their two adjoining free ends can be swung laterally and horizontally underneath the stationary frame in arcs of circles on either side of it or of its longitudinal central portion. These driving track frames and their ground tracks are so pivotally positioned on the stationary frame that their adjoining free ends stand close to and at equal distances from the transverse center of the length of the stationary frame 2. A suitable manually operating mechanism is connected to their free ends that permits the operator to swing their adjoining free ends together in the same direction and at the same time effecting a joint swinging movement of their adjoining free ends in arcs of circles radiating from their pivotal connections with the stationary frame 2, in either direction that they may be moved in or swung from the longitudinal center of their stationary supporting frame.

To the top flanges of the T beams 10 and 10', a flat plate 15 of sheet iron or steel is riveted. This plate 15 forms a supporting deck for the stationary platform frame 2, which has the driving track turning mechanism mounted on it, which will be presently described. In describing these two driving track supporting frames and the driving track mechanism, the description will be confined more particularly to one of them, as they are identical in every particular, and they and the manner in which I move them to steer the tractor, form the essential elements of my invention. They are shown in side elevation in Fig. 1 and in various sectional and other views, and an enlarged plan view of one of the complete driving track supporting frames is shown in Fig. 10. In this view however the top plate 15 has been removed to show the interior and parts contained therein. The two driving track frames A and A' are identical and they are shown pivoted at their outer end portions to the opposite end portions of the main frame 2, but they could be pivoted at any desired portion of their lengths at any points in the length of the main frame 2, that are positioned in the same relative positions to each other, on each side of the transverse center of the frame and tractor. A plan view of these parts relative to each other is shown in Figs. 3 and 11, in which 15 is the top plate and 10 are the T beams of the driving track frame A. The plate 15 is provided with a centrally positioned circular aperture B, in which a circular lug portion 93, that is formed on the bottom of a circular hub-casting 92, fits, while the hub-casting itself also rests on and is bolted to the plate 15. This hub-casting 92 forms the central pivotal axis of the brake band casting 30 and also of the track driving gears 29 and 31, and it is bolted to the plate 15 by the bolts 95, which pass through both plate 15 and casting 92, and clamp the two parts together. The casting 92 has still another projecting portion 96, and a lip 97, circular in section, upon its lower side, the projection 96 being fitted into a corresponding aperture C, in the channel beam shaped frame 2. The hub casting 92 and the plate 15 turn on the frame 2, while the lip 97, which is circular in plan view, and whose circumference 98 is fitted to and turns within the corresponding aperture in housing 5, is fitted on its lower surface to and turns upon the upper surface of the platform frame 2, so that the hub casting 92, forms a turn-table or pivot which turns in the aperture of the stationary platform frame 2 and the housing 5 maintaining the plate 15 and consequently the track driving frame A, of which plate 15 is a part, in contact with the lower surface of the stationary platform frame 2, allowing the swinging of the driving track frame A in a horizontal plane about the axis of the hub casting 92, but preventing any vertical movement or separation between the top surface of the plate 15, and the lower surface of the main stationary platform frame 2. The endless ground treading track supporting frame A', is pivoted to the stationary frame 2 in a similar manner, so that both of the track supporting frames A and A' are pivotally connected and can be swung around their pivotal connections to the stationary frame at points A''—A'' in the manner shown in Fig. 3.

My invention contemplates any means for turning and controlling the track driving frames and for connecting the motor to the endless ground treading tracks, and for steering them to guide the tractor as desired. I preferably however carry out these features of my invention in the following manner:

A manually operating steering wheel 78 is threadedly mounted on a tube 80 (see Figs. 1 and 8), so that when the wheel 78 is rotated, the tube 80 rotates with it. This tube 80 extends downward from the wheel 78 loosely through a casting 7, within which the tube rotates, and at its lower extremity it is fitted into and affixed to a bevel pinion 81, so that when the steering wheel is rotated, the pinion 81 is rotated by it. The pinion 81 meshes with a bevel gear 82, which is keyed on a screw 83, which I term the steering screw. The steering screw 83 is fitted to bearings 84 and 84'' in castings 7 and 8, which are bolted to the main frame 2, and these bearings support the screw 83, which is prevented from moving endwise in either direction by end thrust bearings 85, 85' and 85'' that are positioned in the castings 7 and 8, and which are adjusted by the hexagonal nuts 86 and 86' upon the threaded extremities of the screw 83. The screw 83 has an enlarged threaded portion extending from the bevel gear 82 to the bearing 84', and upon this threaded portion the correspondingly threaded nut 87 is fitted. This nut has a pair of ears 88 projecting outwardly on a horizontal plane, from either side, as in Figs. 3, 31 and 32, and between these pairs of ears the ends of the links 89 and 89', Figs. 3, 29 and 30, are fitted and pivoted upon the pins 90 and 90', which pass through the holes provided for them in ears 88 and through the corresponding holes in the ends of links 89 and 89'. Link 89 is shown in detail, drawn to a larger scale, in Figs. 29 and 30. The other ends of links 89 and 89' are entered into and pivoted within similar pairs of ears borne upon the castings 91 and 91', which are bolted upon the outer faces of the side plates 10 and 10' of the driving track frames A and A', and in the same horizontal plane as the longitudinal axis of the screw 83. Detail views of casting 91 are shown in Figs. 33 and 34. It will be seen from the foregoing that the nut 87 is prevented from turning when the screw 83 is rotated by the steering wheel 78, through the bevel gears 81 and 82, because of the links 89 and 89', and as the screw 83 is prevented from moving endwise, it is obvious that the nut 87 will be caused to traverse the threaded portion of the screw 83 in one direction, when the screw is rotated by the steering wheel in one direction. When the direction of rotation of the steering wheel is reversed, so will the direction of travel of the nut upon the screw be reversed, and as the nut 87 is impelled along the screw 83, it will either pull or push upon the links 89 and 89', and these will impart motion to the driving track frames A and A' around the pivoted joints at their other ends, through the castings 91 and 91'. As the driving track frames are pivoted to the main frame at A''—A'', as already described, they will be caused to travel in arcs about those pivotal points, and when the screw has impelled the nut to the position indicated by the solid lines, as shown in Fig. 3, the driving track frames A and A' will assume positions relative to the main frame 2 and to each other as shown by the solid lines of Fig. 3. As the driving track frames A and A' are the containers of the driving tracks 14 and 14' which carry and propel the tractor as hereinafter described, the tractor will be caused to turn toward the left when moving in the direction indicated by the arrow at end of Fig. 3, and when the screw 83 has impelled the nut 87 to the opposite extreme of travel indicated by the dotted lines the driving track frames A and A' will assume corresponding positions to the opposite side of the main frame 2, as indicated by the dotted lines, and when the tractor is moving in the direction of the arrow at end of Fig. 3, it will obviously be caused to turn toward the right, and as is varied the position of the nut 87, upon the screw 83 between its opposite ends, so will the relative positions of the rack driving frames A and A' be varied with that of the main frame 2 and with each other, and as they vary, so will the course or direction of travel of the tractor be varied.

The inner ends of the driving track frames A and A' Fig. 3, are held in position against the lower side of the main frame 2 by the driving track frame guide rail 8, Figs. 1, 12 and 28, which extends transversely across the lower surface of the main frame 2, to which it is bolted, and it is recessed upon its opposite sides to fit over the projecting arced inner ends of the top plates 15 and 15'. In Fig. 28 the manner in which the projecting arced portions are retained in position by casting 8 is clearly shown.

The driving track frames A and A', together with the main frame 2 and superstructure, are carried upon the track wheels 11, 12 and 13 and 11', 12' and 13' of Figs. 1, 5, 6, 7, 10 and 12, and by track wheels 66 of Figs. 5, 10 and 12. These wheels are fixed upon, carry and rotate with them the axles 67 and 68. Figs. 5, 6, 7, 10 and 12, upon whose end portions the journals 69 and 70 are formed, which carry and rotate upon the cylindrical rollers 71 contained within the bearings 72 and 73, whose flanges 74 and 75 are bolted against the outside surfaces of plates 10 and 10', which form the sides of driving track frames A and A', Fig. 1. These plates have their lower edges bored to fit around and rest upon the upper halves of the bearings 72 and 73, and in this way the weight upon and of the driving track frames A and A' is carried from the bearings 72 and 73 to the journals 69 and 70, transmitted from the journals through the axles 67 and 68 to the track wheels, which resting upon the driving tracks 14 and 14', receive that weight and transmit and distribute that weight to the ground through that portion of their length which comes in contact with and bears upon the ground, namely, from O to P, and from O' to P' of Fig. 1. It will be seen that the driving tracks 14 and 14' are the recipients of the weight of the entire tractor, and that they disseminate it over the large area of ground covered by their contact portions.

The means employed to convey the power generated by the motor 1 to the driving tracks 14 and 14' are as described herewith. The actuating motor 1, Figs. 1 and 2, has at its ends the fly wheels 16 and 16', which are fastened to and revolve as one with the motor crank shaft $19^c$, Figs. 11, 12, and 36, and which fly wheels contain suitable clutches 19ᴬ that are released, and applied simultaneously to clutch surfaces borne upon the fly wheels 16 and 16′, by either one of the foot pedals 17 or 17′ upon the operating platform 6. These foot pedals are connected by suitable shafts, rocker arms and other parts hereinafter described, to the collars 18 and 18′ within which the projecting portions of the clutches contained within the fly wheels 16 and 16′ revolve. The connections between collars 18 and 18′ and foot pedals 17 and 17′ are so arranged that either pedal operates both collars, and upon the proper pressure being applied by the operator to either pedal, will cause both clutches to be withdrawn from their seats in the fly wheels, allowing the motor to run free, without imparting the motion of its crank shaft and fly wheels to the driving shafts 19 and 19′ through the clutches. When the operator removes the pressure from either foot pedal, the clutches are forced upon their seats contained within the fly wheels by suitable springs which they contain, so causing the motor to impart its motion and power through the clutches to the driving shafts 19 and 19′, causing them to rotate as one with the fly wheels and crank shaft. These driving shafts extend from the clutches to and pass through the bevel reduction gear housings 5 and 5′, being carried in tubular passageways, through the fuel tanks 3 and 3′, which lie between the clutches and the housings. Within these bevel reduction gear housings, Fig. 9, the shafts pass through the bevel pinions 21, 21′, 21ᴬ and 21ᴮ, whose rearward portions are made in the form of journals, which rotate in and are supported by the bearings 20, 20′, 20ᴬ and 20ᴮ. These bevel pinions are bored through their longitudinal axes, to receive the driving shafts 19 and 19′, so affording bearings and supports within which the driving shafts may freely rotate. These pinions have, at the inner ends of their teeth, prolongations 138 of circular section, in whose end faces three jawed clutches are formed, which receive similar mating three jawed clutches formed in the end faces of the clutch collars 22, 22′, 22ᴬ and 22ᴮ, the details of one of these collars being shown in Figs. 24 and 25. These clutch collars are bored to receive and are rigidly affixed to the driving shafts 19 and 19′, so that they rotate or move endwise as one with the driving shafts. The clutch collars are so placed upon the driving shafts that when one pair of clutch collars, as 22′ and 22ᴮ, have their clutches engaged with the mating clutches of bevel pinions 21′ and 21ᴮ, the clutches of the other pair of clutch collars, as 22 and 22ᴬ, are entirely away and free from any engagement with the mating clutches of bevel pinions 21 and 21ᴬ. From this it will be seen that when the driving shafts 19 and 19′ are moved endwise either way, they will engage the clutches of the clutch collars with their mating clutches in the bevel pinions, on the side toward which the driving shafts are moved, and when so engaged the pinion in each housing 5 and 5′ will be driven through the clutch collars as one with the driving shafts, while the disengaged pinion in each housing 5 and 5′ will be left free to rotate upon the driving shafts 19 and 19′. Since all four pinions 21, 21′, 21ᴬ and 21ᴮ are constantly in mesh with bevel gears 29 and 29′, the engaged pinions driven by the driving shafts 19 and 19′ will drive the bevel gears 29 and 29′ in one direction, while the disengaged pinions will be driven by the bevel gears 29 and 29′ in the opposite direction upon the driving shafts 19 and 19′, this opposite rotation of the disengaged pinions being caused by their being upon opposite sides of the bevel gears 29 and 29′ from that of the engaged pair of bevel pinions. From the foregoing it will be seen that when the idle pair of bevel pinions are engaged, by moving the driving shafts endwise in the opposite direction, and the driving pair of bevel pinions thus disengaged, the newly engaged bevel pinions will drive the bevel gears 29 and 29′ in an opposite direction from that which the newly disengaged pair had driven them, thus causing the rotation of the gears communicating with the driving tracks, hereinafter described, to be reversed, and so reversing the direction of movement of the driving tracks and of the tractor.

To attain the endwise movement of the driving shafts 19 and 19′ as hereinbefore described, they have affixed upon them the collars 137 and 137′, Fig. 11, near their ends which enter into the fly wheel clutch collars 18 and 18′, Fig. 26. These collars 137 and 137′, one of which is shown in detail in Fig. 26, are composed of two pieces 23 and 24, which screw together and form the complete collar 137 or 137′. These collars are identical and collar 137 which is taken for the purpose of description bears a rectangular groove or recess around its outside circumference, in which is fitted the annular ring 25, which bears upon its opposite sides the lugs 26, which fit into corresponding holes in the forked ends of the reversing bar 27, shown in Figs. 11 and 12. This reversing bar is connected to and controlled from either reversing lever 76 or 76′, by suitable shafts, bell cranks and other parts hereinafter described. From the foregoing it will be seen that the collars 137 and 137′ are free to rotate within the annular rings 25 and 25′, while these rings are prevented from rotating by the lugs 26 being held by the forked projections of the reversing bar 27, and as this bar is as one piece when assembled, it is apparent that if it be moved in either direction along a plane parallel with the axes of the shafts 19 and 19', that motion will be imparted to and through the rings and collars 25 and 25' and 137 and 137' to the driving shafts 19 and 19' simultaneously, and in the same amount that the bar 27 is moved, within the limits of travel endwise and either way allowed by the clutch collars 22, 22', 22^A and 22^B, Figs. 9 and 11. These clutches are engaged and disengaged with the mating clutches in bevel pinions 21, 21', 21^A and 21^B by that endwise movement as hereinbefore described. It is apparent from the foregoing description that if either reversing lever 76 or 76' be moved to the extreme point of travel allowed it in either direction, it will cause the driving gears to be so enmeshed as to propel the tractor in the same direction as either reversing lever 76 or 76' has been moved.

In order that the driving shafts 19 and 19' may have this endwise movement and still transmit to the gearing the power generated by the motor, the ends which enter into the fly wheel clutch collars 18 and 18', Fig. 2, are squared for a portion of their lengths as shown at 28, Fig. 26, and these squared portions slide back and forth within the correspondingly squared holes in the fly wheel clutch collars 18 and 18' of Fig. 11. In this way the shafts 19 and 19' are free to move endwise in the collars 18 and 18', as directed by the levers 76 and 76', but must rotate with the collars 18 and 18' when they rotate.

As hereinbefore described, the driving pinions 21' and 21^B, or 21 and 21^A, Fig. 9, are caused, according to the positions of the reversing levers 76 and 76', to drive the bevel gears 29 and 29', which are bolted to and drive the brake spiders 30 and 30', upon which the bevel pinions 31 and 31' are also bolted, so that the three parts 29, 30, and 31, and 29', 30' and 31' respectively, of each set, rotate as one about the vertical journals 32 and 32'. The downward thrusts caused by the driving pinions 21' and 21^B or 21 and 21^A, and the driven bevel gears 34 and 34' are carried upon the annular ring thrust bearings 33 and 33'. Bevel pinions 31 and 31' in turn mesh with and drive the bevel gears 34 and 34', which are bolted to and drive the gear spiders 36 and 36' whose hubs are fitted to receive and are keyed to the cross shafts 35 and 35', so that 34, 36 and 35 and 34', 36' and 35' respectively are driven and rotate as one, by bevel pinions 31 and 31'. At the back faces of gear spiders 36 and 36' the cross shafts have an enlarged portion 37, Fig. 4, which is threaded to receive the correspondingly threaded collar 38, which screws against the back face of gear spider 36, and prevents it from moving endwise upon the shaft 35, and so allowing bevel gear 34 to move out of alinement with bevel pinion 31. Lock collar 39 screws tightly against adjusting collar 38, so preventing it from unscrewing. The cross shaft 35 then passes through the holes 40 on opposite sides of the spherical gear cover 41, and through the shaft sleeves 42 and 42', which are fitted and bolted to the gear cover 41, and are bored to receive the shaft 35 and to fit over the ends of the cross shaft bearings 45 and 45', which are fitted to receive them. The shaft 35 is threaded at 43 and 43' to receive the correspondingly threaded adjusting collars 44 and 44', which screw against the faces of the bearings 45 and 45', preventing end movement of the shaft 35. The lock collars 46 and 46' screw against collars 44 and 44' locking them in position. The bushings 47 and 47' are bored to receive and are keyed to and rotate with shaft 35, and their outer diameters are fitted to and rotate within the bearings 45 and 45', thus providing large and ample bearing areas for the shaft 35. The bearings 45 and 45' have flanges 48 and 48' which bear against and are bolted to the side gear frames 49 and 49', also projections 50 and 50' of circular section, which are fitted to holes bored in 49 and 49' to receive them. Those portions 51 and 51' of the shaft 35, which project beyond the bearings 45 and 45' and into pinions 52 and 52', Figs. 1, 4 and 9 are square in section, and are fitted into correspondingly squared holes within the pinions, so that the pinions revolve as one with shaft 35, and so driving the mating gears 53 and 53', Figs. 1, 4 and 9 which rotate upon the journals 54 and 54', which are part of castings 49 and 49'. The gears 53 and 53' in turn mesh with and drive the gears 55 and 55', Figs. 1, 4 and 9, whose hubs have squared apertures to receive the correspondingly squared portions 56 and 56' of the shaft 57, and so drive said shaft. Near the ends of the shaft 57, the journals 58 and 58' are formed, which are supported by and rotate upon the cylindrical rollers 59, contained by the bearings 60 and 60', whose flanges 61 and 61' are fitted into corresponding holes in side gear frames 49 and 49', and are bolted against the outer surfaces of side plates 10 and 10' of driving track frames A and A', as are also the side gear frames 49 and 49'. The shaft 57 carries upon it the driving sprockets 63, 63' and 63^A, which are firmly affixed to it and rotate as one with it. These sprockets have teeth 64 cut in their outer peripheries, which engage the bushings 65 in manner similar to that which the teeth of a chain sprocket engage and drive the rollers of a roller chain. These bushings are contained by and are a part of the driving tracks 14 and 14' of Fig. 1, a detailed portion of which is shown in Fig. 14, and whose component parts are illustrated in Figs. 16 to 23 inclusive. The sprockets 63, 63', and 63^A consequently, by so engaging and driving the bushings 65, impart motion to and drive the driving tracks 14 and 14', Fig. 1, so that the driving tracks are caused to move around their respective courses similar to the course of an endless driving belt around its driving and driven pulleys, and so propel the tractor in a direction opposite to the direction in which the bottom portions of the driving tracks, which come in contact with the ground, are driven, or in the same direction as the traction wheels of common type tractors would cause those tractors to be driven, if their traction wheels were rotated in the same direction that the driving sprockets 63, 63' and 63^A are rotated, and when the direction of rotation of the driving sprockets 63, 63' and 63^A is reversed, as hereinbefore described, so will the direction of movement of the driving tracks, and the direction and movement of the tractor be reversed.

It will be seen, from the foregoing description, and from the various drawings, the method of communicating the power generated by the motor to the driving track 14 is identical with that utilized to communicate it to driving track 14', and that the mechanism employed for the one is similar to and a duplicate of the other. It will also be apparent that since the driving track frames A and A' are pivoted and describe arcs around the vertical axis of casting 92, which is also the common vertical axis of the bevel gearings contained within housings 5 and 5', that the cross shafts 35 and 35' with their gear spiders and bevel gears 36 and 34 and 36' and 34', will describe corresponding arcs in a horizontal plane about this same vertical axis, when the driving track frames are actuated by the steering wheel, as hereinbefore described, for since the shafts 35 and 35' are supported by the bearings 45 and 45', rigidly affixed to the side gear frames 49 and 49', which are in turn rigidly affixed to and carried by the track driving frame plates 10 and 10', any movement of the driving track frames A and A' is communicated through side gear frames 49 and 49', and the bearings 45 and 45' to the shafts 35 and 35', which so move in unison with the track frames A and A', and shafts 35 and 35' in turn communicate that movement to the spherical gear covers 41, through the shaft sleeves 42 and 42', which are fastened to the spherical gear covers 41 and are carried by the shafts 35 and 35', so that 41 is caused to describe arcs about the said vertical axis, upon the circular seat 99, provided for that purpose, upon the upper portions of housings 5 and 5' and upon which seat the lower portions of 41 are fitted and rest.

The driving tracks 14 and 14', Figs. 1, 13 and 14, whose several parts are shown in Figs. 16 to 23 inclusive, and various vertical cross sections through which are shown in Figs. 4, 5, 6 and 7, are driven by means hereinbefore described, around courses similar to the course traversed by an endless driving chain over its driving sprocket, across from the driving sprocket to the driven sprocket, over the driven sprocket, across and back to the driving sprocket, and so repeating indefinitely.

The driving sprockets 63, 63' and 63^A of Figs. 4 and 10, perform the driving functions, and carry the driving tracks around portions of their circumferences in a similar manner to the way that the driving sprocket drives and carries the chain in the figurative illustration described above, while the wheels 11, 11' and 11^A of Figs. 7 and 10 carry the driving tracks around portions of their circumferences in a manner similar to the way the driven sprocket carries the chain. The track wheels 12, 13 and 66, Figs. 1, 5, 6, 7 and 10 bear and roll upon the upper edges of the links 100, Figs. 4, 5 and 6, and transmit the weight carried by them, through the links 100 to the corrugated tie plates 101, Figs. 13, 22 and 23. The links 100 are bolted upon tie plates 101 by track bolts 102, Figs. 13, 14, 20 and 21, being shaped upon their lower edges to fit the corrugations of tie plates 101, and have suitable lugs through which track bolts 102 pass, so that the links are held rigidly, and in pairs of right hand and left hand links, in the positions shown in Fig. 13. The links 100 have offset ends and inset ends as shown in Figs. 16 and 17, so that they fit underneath the mating ends of the next links, and over the mating ends of the preceding links, and in their inset ends are holes fitted to receive the ends of the bushing 65, one end of which is shaped as shown in Fig. 19, which end enters into a hole shaped as in Fig. 17, preventing the bushings from turning in the links. The opposite end of the bushing is round and enters a round hole in the inset end of the opposite link of the pair, and when the three bushings are placed in position within the inset ends of the three pairs of links, which are borne by and bolted to tie plates 101, the tie plate carrying the three pairs of links and the three bushings, can be slid forward as a single piece, and the inset ends of the links which contain the bushings entered between the offset ends of the links mounted upon the tie plate adjacent. When so entered, the holes through the axis of each bushing will register with the holes in the offset ends of the adjacent pairs of links, so that link pin 103, Figs. 4, 5, 6, 7, 13, 14 and 15, which is fitted to these holes, may then be slipped through the holes in the offset ends of the links, and in the bushings, till it is in place, as shown in plan view of Fig. 13. It then joins and holds in position the three pairs of links of the one tie, and the three pairs of links of the adjacent tie, and as the bushings 65 are prevented from turning in the links, as already described, the bushings 65 and their links 100 are as one, and may pivot and turn upon and around the axis of link pin 103. Link pins 103, Fig. 15, have upset portions on their one ends, and holes in their other ends, through which pins 104, Fig. 14, pass, and which lay in the slotted lugs provided for them upon the sides of 100, as shown in Figs. 14 and 17, so preventing link pin 103 from moving endwise or turning in the links, 100. It will be seen, from the foregoing, that the driving tracks may bend at the joints formed as described, as a roller chain bends at its joints, when passing over its sprockets.

Figure 6:
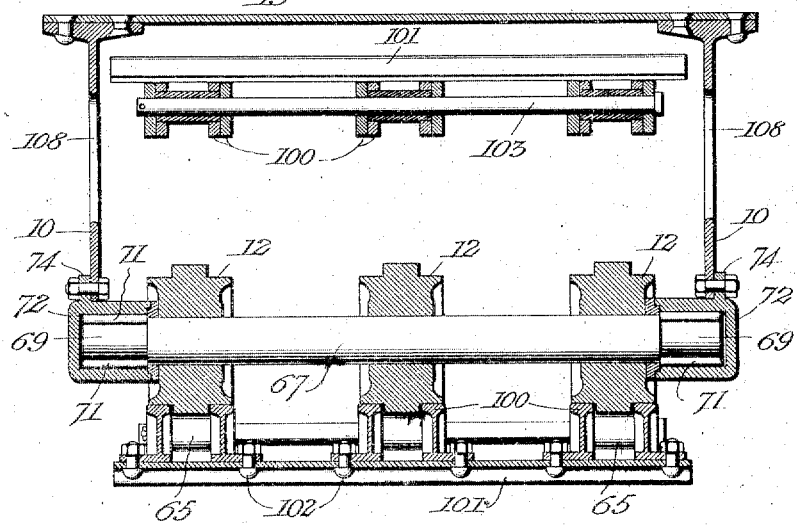
Fig. 6, is a vertical transverse section through the line 6—6 of Fig. 1.

The track wheels 12, 13 and 66, Figs. 1, 5, and 6, rest upon the upper edges of links 100 as described hereinbefore, so that a track very similar to a railroad track is afforded for these wheels to pass over, in which the tie plates 101 correspond to the cross ties, the top portions of links 100 to the rails, and the track bolts 102 to spikes holding the rails to the ties, and the track wheels 12, 13 and 66 roll along this track in a similar manner to that of the truck wheels of a railway carriage rolling along the rails of a railroad track.

The wheels 11, 11' and 11ᴬ, Figs. 7 and 10, however, rest not upon the upper edges of the links 100, but run between the pairs of links and rest upon and are carried by the bushings 65.

The track wheels 12 and 13, Figs. 1, 5, 6, and 10, are provided with flanges upon their outer edges, and upon their central portions respectively as shown in the several figures, whose purpose is to hold the driving tracks from moving out of position sidewise from their course of travel.

To compensate for wear and consequent loosening and sagging of the driving tracks, I have provided a means of adjusting and tightening the same, which is as follows:

The bearings 73, Figs. 7 and 10, which carry the shaft 68, and its wheels 11, 11' and 11ᴬ, are so made, and the apertures in side plates 10 of driving track frame A, so shaped as to allow lengthwise movement in track frame A, of bearings 73, with their shaft 68 and wheels 11, so that their movement when away from the other end of track frame A, will obviously tighten the driving tracks, and when moved toward the other end of driving track frame A, will as obviously loosen the driving tracks. This movement of bearings 73, shaft 68 and wheels 11, is accomplished by rigidly affixing to the flanges 75, Figs. 1 and 7, the stud 105, Fig. 1, which projects toward and slides through the casting 106, which is affixed to side plate 10 of the track driving frame A. That portion of the stud 105 which protrudes beyond casting 106 is threaded and has upon it the similarly threaded nut 107 which bears against the face of casting 106, so that as the nut 107 is tightened upon stud 105 it will pull upon said stud, which being fastened to the flange 75 of bearing 73, draws said bearing with its shaft and wheels toward the nut, so that when the nut 107 is tightened upon stud 105, the driving tracks are tightened, and when it is loosened so too are they loosened. Similar devices are placed upon each side of each driving track frame, in order that bearings 73 and 73' may be moved an equal amount, and shafts 68 so kept in alinement.

The circular apertures 108, Fig. 1, in the side plates 10 and 10' of the driving track frames A and A' are hand holes to serve the idler wheels 109, Fig. 10. These idler wheels support those portions of the driving tracks 14 and 14', which extend from the tops of driving sprockets 63, 63' and 63ᴬ at one end of the driving track frames A and A', to the tops of wheels 11, 11' and 11ᴬ, at the other end, so preventing undue sag and strain in those top portions.

The draft gear of the machine or vehicle to be drawn by the tractor is attached to a pin contained in hole 111 of casting 110, Figs. 10 and 12. This casting and a duplicate are each fastened by bolts and rivets into the outside ends of driving track frames A and A', and each casting has central with hole 111, a series of ears, with pockets or spaces between them arranged vertically, one above another. These ears are pierced by hole 111 through which a suitable pin is passed. These pockets and ears are shown in Fig. 12. To the pin in hole 111 may be attached the hook, clevises, chains or other draft gear connected to whatever vehicle or machine it is desired to draw, and as the said ears and pockets are placed vertically one above another, the height above the ground that the draft gear is attached to the tractor may be varied at the will of the operator, by attaching said draft gear to pin in hole 111 in the upper pockets of casting 110, or in the lower pockets, as he so desires. The holes 112 and 113 in the casting 110 and in the top webs of plates 10 and 10', are those through which the bolts and rivets are passed, which fasten top plate 15, Figs. 4, 5, 6 and 7, in position upon the top of the driving track frame. In the figures, top plate 15 is shown riveted to place.

The rods 114, Figs. 1 and 10, are stay rods used to brace the bottom portions of the driving track frames A and A', and hold them in position.

In Fig. 4, plates 115 and 115', form oil tight covers over the outside faces of the side gear frames, to which they are suitably attached. They thus cover and protect the gears 52, 53 and 55 and 52', 53' and 55' and also prevent oil or other lubricant contained in the cavities so formed, from escaping and so being wasted.

The braking and controlling of the speed of the tractor as when going down a heavy grade, is accomplished in the following manner: When the brakes 116, Figs. 4 and 9, are to be applied, the operator pushes with his foot upon either one of the foot pedals 17 or 17', Figs. 1 and 2, which action first disengages the clutches contained in fly wheels 16 and 16', as hereinbefore described, and allows the engine to run free. He then increases the pressure upon the operated pedal, which will then travel still farther away from him, and this additional travel actuates certain cables, rods, bell cranks, and other mechanism hereinafter described, connecting the foot pedals to the brake bands 116, Figs. 4 and 9, contained within the housings 5 and 5', so causing the brake bands to be applied to their seats 117 and 117', which are part of brake band spiders 30. As these spiders are connected to and driven by the gears communicating with the driving tracks, as hereinbefore described, the braking force set up by the brake bands 116 upon their seats 117, will be communicated to the driving tracks, so retarding their movement. If the pressure upon the foot pedal be increased, the driving tracks will be brought to rest, thus stopping the tractor.

It will be seen from the above, and from foregoing description contained within this specification, that the foot pedals 17 and 17' mounted upon the operating platform 6 in Figs. 1 and 2, control and operate the clutches connecting the motor 1 with the driving shafts 19 and 19', and that they also control and operate the brakes. It is obvious that the clutches may be applied and released, without applying the brakes.

Upon examining the arrangement and position of the two operating seats 77 and 77', Figs. 1 and 2, the reversing levers 76 and 76', the combined clutch and brake pedals 17 and 17', the double spark advance lever 119, and the double throttle lever 118, in relation to the steering wheel 78, it will be seen that operating seat 77 has reversing lever 76, foot pedal 17, spark lever 119 and throttle lever 118, so placed as to be conveniently actuated by the operator's right hand and right foot, when he is seated in 77. When he is in this seat he would obviously drive the tractor in the direction in which he is facing, or toward the left in Figs. 1 and 2, and should he desire to drive the tractor in the reverse direction or toward the right, in Figs. 1 and 2, he would leave seat 77, cross over and occupy seat 77', where he would have reversing lever 76', foot pedal 17, spark lever 119 and throttle lever 118 in the same relative position to his new station in seat 77'. Consequently he would operate them with the same right hand and right foot as before. This system of operating all controls of the tractor from either of the two seats or positions, by the same hand and foot of the operator, allows him to face in the direction of travel of the tractor at all times, and obviates the confusion and uncertainty which another form of control would entail, such as the control in tractors where the operator sits facing one way and in backing has to turn his head and twist his body to see to steer and guide the tractor as it moves backward. In my machine all the operator has to do is to change seats by which he reverses the direction he faces and he then faces in the direction he is going to back his machine. This is a novel, useful and valuable feature in a traction engine. For this reason the throttle lever 118, Fig. 2, and the spark advance lever 119, are made double ended, as shown, and are mounted according to usual automobile practice, upon the double quadrant 120, which is an annular flat ring carried by its two arms 121, upon the rod 122, Figs. 2 and 8, to whose upper end it is rigidly affixed. The rod 122 forms the center of the steering post 79, Fig. 1, and passes through the steering post 79, having its lower end threaded and screwed into the U-shaped stirrup 123, Fig. 8, whose upper extremities are bolted to the sides of casting 7. The nut 124 screws onto the protruding end of rod 122, and so locks and prevents rod 122 from unscrewing out of stirrup 123. The rod 122 consequently is held stationary when steering wheel 78, Figs. 1 and 2, is rotated, and so holds the quadrant 120 stationary also. The spark advance lever 119, Fig. 2, is fitted over and keyed to the tube 125, Fig. 8, which fits over and is free to rotate about the rod 122, when motion is communicated to it through lever 119. On its lower extremity is fitted and keyed the lever arm 126, so that any motion of lever 119 is communicated through the tube 125 to lever arm 126. From the eye in the end of lever arm 126 a flexible cable or other suitable connection, not shown, extends to and communicates that movement to the timer mechanism, which is usually mounted on the magneto of the motor.

In a similar manner the double throttle lever 118 is fitted and keyed to the tube 127, Fig. 8, which fits over and is free to rotate upon tube 125. Its lower end is fitted into and keyed to the lever arm 128, so that any motion given the double throttle lever 118 is communicated to and through the tube 127 to the lever arm 128, and from the eye in the end of 125 a flexible cable or other suitable connection not shown extends to and communicates that movement to the throttle valve of the motor, which is usually mounted on, and a part of the carbureter.

These parts, their purpose and action, are well understood by those skilled in motor construction, so that further description or illustration of these parts is unnecessary.

The radiator 4, Figs. 2 and 8, or cooling means for the engine cylinders 1, if a water jacketed type of motor be used, is composed of a number of small thin tubes 135, Fig. 8, arranged symmetrically in horizontal and vertical rows, extending horizontally from end Q to end R, Fig. 2, where their ends enter and are calked in suitable heads. As will be seen from the cross section of radiator in Fig. 8, the tubes 135 have spaces between them for air to pass through. The tubes and heads are covered upon the top and sides by the sheet metal casing 136, which midway between the ends Q and R, merges into the stack 134, which rises vertically above the radiator casing 136, and whose bottom portion contains the nozzle 132, whose vertical axis coincides with the vertical axis of stack 134. This nozzle points upward and its lower portion is connected to and is in communication with the exhaust manifold 133 of motor 1. This exhaust manifold carries the exhaust and waste gases from the cylinders of motor 1 to the nozzle 132, which expels them violently upward through stack 134 and so drawing air through the opening, at the bottom of radiator left in casing 136, between and around tubes 135, along these tubes from end Q and end R to stack 134, and out the stack. The current of air thus passed between, around and along the horizontal tubes, cools the cooling agent contained within them, which may be water, oil or other suitable fluid. After it has been so cooled, it is taken from the bottom of the head at Q, through the suction pipe 129 to the circulating pump 131, which delivers it to the cylinder jackets of motor 1, where as it passes around the cylinders, it absorbs the heat dispelled; it then leaves the cylinder jackets through the pipe 130, is carried to and enters into the top of the radiator head at end Q, flows backward and forward through the horizontal tubes 135 until it finally arrives, in a cooled state, at the bottom of the radiator head at Q, where it is again delivered to circulating pump 131 through suction pipe 129, and so repeating the same circuit as described indefinitely.

The reversing levers 76 and 76' are positioned in such positions relative to both seats that the operator may readily reach them from either seat, and they are so connected to each other and to the reversing bar that when either of the levers is actuated by the operator, the other lever moves in synchronic unison with the actuated lever, and is moved to the same amount and relative position, and in the same direction as the actuated lever, this synchronous unison of movement of the two levers being made necessary in order that the tractor may have its direction of travel reversed from either of the operator's seats 77 or 77', and may also have the motion of the operator's hand when performing this office, the same, irrespective of which of the two oppositely facing seats he may occupy when performing this function.

The foot pedals 17 and 17' are placed in the same relative position to the seats 77 and 77' from which they are respectively actuated by the operator's right foot, as hereinbefore described. They actuate the clutches and brake mechanism, and are connected each to the other in such manner that when the operator's right foot actuates either pedal, the other pedal is moved, through the connecting mechanism, in synchronic unison, to the same amount, and assumes the same relative position to the vacant seat opposite the operator as the actuated pedal has been caused to assume to the seat in which the operator is stationed. This synchronous movement of the two pedals in opposite directions is necessary in order that the same direction of movement of the operator's right foot may accomplish the same result, regardless of which of the two oppositely facing seats he may be sitting in.

The connecting mechanism of the foot pedals 17 and 17' when at rest, lock and prevent any movement of the reversing levers 76 and 76', as will be presently described, and their connecting mechanism together with the connecting mechanism of the reversing levers, and their principles of action, will be described according to their chronological sequence of action as follows:

Assuming that the operator is stationed in seat 77', Figs. 1, 35 and 36, and that the tractor is traveling in the direction in which he is facing, which is the direction of the arrow X, Fig. 35, and that he wishes to stop the tractor and reverse its movement so that the tractor will be caused to move in the direction opposite to that in which it is now moving, he places his foot upon pedal 17 and puts sufficient pressure upon it to cause the said pedal to move a given distance away from him. The pedal 17 is mounted upon a bell crank 140 whose lower end is fitted to and keyed upon a tubular shaft 141 carried within bearings 142 and 143, so that any movement of pedal 17 is transmitted through bell crank 140 to the tubular shaft 141. Upon examination of Fig. 35 it will be seen that the bell crank 140 and a rocker arm 144 which is also fitted and keyed to the 130 tubular shaft 141, bear upon the opposite end faces of the bearings 142 and 143, which are bolted to the operating platform 6 preventing any endwise movement of the shaft 141. Tubular shaft 141 is, however, free to rotate within its bearings, and consequently the foot pedal 17 may describe arcs about the axial center of said shaft. The shaft 141 extends from the bell crank 140 through its bearings 142 and 143, and through rocker arm 144 which is fitted and keyed upon it, so that any rotative movement received from foot pedal 17 through bell crank 140 is transmitted along the shaft 141 and communicated to rocker arm 144, to whose upper end a link rod end 145 is attached. To the other end of link rod end 145 is screwed a link rod 146, which extends across and screws into a similar link rod end 147, which is attached to a rocker arm 148 whose lower end is fitted to and keyed upon a shaft 149, which is supported at one end by a bearing 150 and extends through a tubular shaft 151, within both of which it is free to rotate, but is prevented from moving endwise by the rocker arm 148, and a double rocker arm 152, which is fitted and keyed to its other extremity. From the foregoing it will be seen that the link rod 146 transmits the motion received from the rocker arm 144 to the rocker arm 148, which communicates that motion through shaft 149 to the double rocker arm 152, which in turn communicates that movement to connecting rods 153 and 154, through rod ends 155 and 156, and these connecting rods in turn convey that movement to the bell cranks 157 and 158 through rod ends 159 and 160, and these bell cranks 157 and 158 again convey said movement to shafts 161 and 162, to whose end portions the upper ends of the bell cranks 157 and 158 are fitted and keyed. The shafts 161 and 162 are carried within bearings 163 and 164, within which they are free to rotate; they are however, prevented from moving endwise by the said bell cranks 157 and 158 and bell cranks 165 and 166, which bear against the opposite end faces of the bearings 163 and 164. The bell cranks 165 and 166 are fitted and keyed to shafts 161 and 162, and receive the motion of said shafts, and their upper ends have slotted holes which fit over lugs upon opposite sides of annular rings 167 borne upon the clutch collars 18 and 18' already described. When pressure is placed upon the foot pedal 17 by the operator as described, the pedal describes an arc about the axial center of shaft 141, and the motion is carried through the several parts herein described, and the clutches, together with the clutch collars, to which they are attached, are caused to be withdrawn from their seats in fly wheels 16 and 16', Fig. 11, and the engine now runs free. The operator now increases the pressure upon pedal 17, which causes it to travel still farther away from him, and this additional movement causes the clutches to be withdrawn still farther away from their seats and also an increased travel of the lower end of bell cranks 157 and 158, to which are attached rod ends 168 and 169. Into these rod ends are screwed eye rods 170 and 171, into whose eyes cables 172 and 173 are fastened, and these cables extend from these said eye bars to and over pulleys 174, across and to the eyes in eye bars 175, to which they are fastened, and when there is no pressure upon foot pedal 17 or 17' there is a predetermined amount of slack in cables 172 and 173. When pressure sufficient to cause the clutches 18 and 18' to be withdrawn from their seats in fly wheels 16 and 16' has been applied to the foot pedal, the consequent movement of bell cranks 157 and 158 takes up the slack in the said cables, and upon the increased pressure being applied to foot pedal 17, the increased travel of bell cranks 157 and 158 caused by this additional pressure, causes the cables to draw or pull upon the eye bars 175, which pass through stuffing boxes 176, Fig. 37, through the walls of castings 177, and into cavities in said castings, where their end portions screw into and are fastened to the rod ends 178, which are in turn attached to the ends of brake levers 179. These brake levers are pivoted near their opposite ends upon the vertical shafts 180, which are contained and supported within the castings 177, and these said brake levers bear upon them the rocker arms 181 and 182, to which the ends of the brake bands 116 are attached by the pins 184. Swiveled adjusting couplings 185, are secured to the arms 182, by which adjustment of the brake bands 116 is achieved. It will be seen that by placing the rocker arms 181 and 182 in the relative positions shown that the well known principle of the differential brake is used, and it will also be apparent that when the cables 172 and 173 draw upon the eye bars 175, the said eye bars will communicate that motion to the levers 179, and these will in turn apply the brakes 116 to their seats 117 and 117', see Fig. 9, and so cause the tractor to come to rest as described hereinbefore. Having now described the manner in which the foot pedal 17 communicates and actuates the clutch and brake mechanism, the mechanism connecting pedal 17 with pedal 17', and its action, will in turn be described.

Rocker arm 148 bears upon it a dog 186, and when foot pedal 17 has moved sufficiently to apply the brakes as described, this dog will at the same time be lifted away from engagement with a sector 187, and as this sector is rigidly affixed to a bell crank 188, which is rigidly mounted on a reversing shaft 189 to be presently described, this disengagement allows the reversing levers 76 and 76' to be moved to any desired positions. By means of this sector and dog the reversing gear is locked in any one of the three positions desired, namely, ahead, neutral, and reverse, and by this means it is impossible to shift the gears of the tractor until after the brakes have been applied, and the consequent release of the dog 186 from the sector 187 accomplished. Since the tractor is so brought to rest before the gear shifting is possible, the gearing and driving mechanism of the tractor is protected from any injury that might otherwise be inflicted upon it.

Rocker arm 148, Fig. 36, is connected by a link 190 to a bell crank 191, which is fitted to and keyed upon a tubular shaft 192, supported by and free to rotate within the bearings 193 and 194. Endwise motion is prevented by the bell cranks 191 and pedal crank 195, which bear against the opposite end faces of the bearing 193. Pedal crank 195 has its lower end fitted and keyed to shaft 192 and bears foot pedal 17' upon its upper end. Upon examination of the various parts herein described and their relative positions each to the other, it will be seen that any movement of foot pedal 17 will be transmitted from rocker arm 148 through link 190 along shaft 192 through pedal crank 195 to foot pedal 17', and that the connecting mechanism is so arranged that foot pedal 17' will be caused to move in the opposite direction from that in which foot pedal 17 is moved.

The operator having now caused the tractor to come to rest, and in so doing unlocked the reversing mechanism, continues to hold foot pedal 17 in its extreme forward position, while he grasps reversing lever 76' with his right hand and pulls it toward him to the extreme point of travel allowed it; this being done, he releases foot pedal 17, which is returned by the springs 196, Fig. 11, in the flywheel clutches 18 and 18', to its original position, and in so doing the dog 186 falls into notch 209 of sector 187, and so automatically locks the reversing mechanism in the new position, and at the same time connecting the motor, through the clutches, to the gearing for driving the tractor in the reverse direction, as hereinbefore described. The reversing levers now assume the positions shown in Figs. 1 and 2.

When the operator pulls the reversing lever 76' toward him, it describes an arc about the axial center of the shaft 189, upon whose end portion the lower end of said lever is mounted and keyed. Shaft 189 is carried and is free to rotate within the tubular shaft 192, but is prevented from moving endwise by the one face of the hub reversing lever 76' resting against the end face of bearing 194, and the opposite face of sector 187, which is rigidly affixed to bell crank 188 and rests against the hub of the rocker arm 191. Arm 188 has its lower portion fitted and keyed to shaft 189, so that any motion conveyed to shaft 189 from reversing lever 76' is delivered to sector and arm 188, to whose upper end a link 197 is fastened. Into the other end of said link a double rocker arm 198 is attached, so that any motion delivered to rock arm 188 is conveyed through link 197 to double rocker arm 198, whose lower portion is fitted upon and keyed to the tubular shaft 151, so that the said motion conveyed to double rocker arm 198, is conveyed to said shaft. Tubular shaft 151 is carried by and is free to rotate upon shaft 149, and by bearing 199, through which it extends, and enters into the upper portion of a bell crank 52$^A$, which is fitted and keyed upon the extremity of said shaft, which shaft is prevented from any endwise movement by the one face of the hub of bell crank 52$^A$ resting against the end face of bearing 199, and the other hub face bearing against the adjacent hub face of double rocker arm 148. It will be seen from the above that any motion conveyed to tubular shaft 151 from double rocker arm 198, will be communicated through shaft 151 to bell crank 52$^A$, to whose lower end a link 200 is attached, and said link has its other end pivotally attached to a pin projecting from a casting 201 which is rigidly clamped upon the reversing bar 27 which is carried and free to move endwise in either direction, within the bearings 203, near its ends, so that motion delivered to rocker arm 52$^A$ is conveyed through link 200 and casting 201 to reversing bar 27, which is accordingly moved endwise in one direction or the other as either reversing lever is moved in one direction or the other. Reversing bar 27 has rigidly clamped upon its end portions forked extensions 204, whose upper forked portions straddle the collars 137 and 137' mounted upon the driving shafts 19 and 19', and in the end portions of the said forks are holes which are fitted to the lugs 26 borne upon opposite sides of the annular rings 25 mounted upon the collars, so that endwise movement of reversing bar 27 is conveyed through extensions 204 to and through the annular rings 25 mounted on the collars, and through said collars to the driving shafts 19 and 19', so that endwise movement of reversing bar 27 causes driving shafts 19 and 19' to be moved endwise in the same direction, and to the same amount. This endwise movement of said shafts causes the gearing of the tractor to be reversed as has been described within the preceding portions of this specification.

Having now described the manner and means by which reversing lever 76' communicates with and actuates the reversing mechanism, the mechanism connecting re- versing lever 76′ with the reversing lever 76 and its action, will in turn be described.

Double rocker arm 198 is connected by a link rod 205 through link rod ends 206 with the upper end of a bell crank 207, whose lower portion is fitted and keyed upon a shaft 208, so that any motion received by double bell crank 198 will be conveyed through link rod 205 to bell crank 207, and through said bell crank to shaft 208. Shaft 208 is carried and is free to rotate within the tubular shaft 141, but is prevented from having endwise movement by the hub of the reversing lever 76 which is rigidly fixed to said shaft resting against the vertical outer face of the frame 2, while the hub of the rocker arm 207 rests upon the opposite end face of the tubular shaft 141. Reversing lever 76 being fitted and keyed upon the end portion of the shaft 208, any rotative movement conveyed to the shaft 208 by bell crank 207 is communicated to said reversing lever 76, and vice versa. From the foregoing it will be seen that since movement of reversing lever 76′ causes a similar movement of reversing lever 76, then movement of reversing lever 76 will cause a similar movement of reversing lever 76′.

In the construction of my tractor suitable means will be employed to properly lubricate such parts as require lubrication, but owing to the small scale necessary to produce the several figures of the drawings, the means that will be employed for lubricating some of the parts has not been shown.

The operation is briefly as follows, in view of the above detail description:

The tractor is propelled by any suitable motive power and the tractor tracks bear on the ground with a flat footed pressure that extends over a large area of ground surface, this construction being in contradistinction to the common type of tractor, in which side wheels are used that only bear along a transverse line of their peripheral surfaces. These tracks are composed of endless belts that lie flat against the ground along the whole length of their lower side, which are successively and continuously walking on and sinking into the ground as these endless tracks rotate. Consequently they have a large area of surface constantly bearing against the ground, of approximately 10¼ square feet, for each track. The tractor for ordinary purposes weighs approximately 18,000 pounds, and each track has a bearing pressure on the ground of about 900 pounds per square foot of its ground engaging surface, which would give a traction hold or pressure on the ground of about 18,000 pounds, which will enable it to pull any load without slipping that the motor will handle, and which pressure is being continuously exerted as the endless tracks are rotated.

The operator sits in whichever one of the two seats allows him to face in the direction in which he wishes to drive the tractor ahead of him, and the motor and the steering machinery and the brakes are all controlled by the operator from either seat and when going in either direction. Either one of the opposite ends of the stationary platform is the tractor's front end when it is being propelled ahead of that end, and either one of the two tracks is the front track when moving ahead of its outer end.

Consequently my invention provides a tractor of enormous draft or ground traction power, and provides a tractor that is double head ended and will move ahead equally as well in either longitudinal direction, and one that can be easily controlled and steered to turn in circles of short radii.

My invention provides a light, strong, efficient and easily controlled traction engine, and while I have illustrated and described the preferred construction of the same, obviously changes may be made in the details of construction and the forms and arrangements of its parts and pieces without departing from the spirit of my invention.

Having described my invention, what I claim as new and desire to secure by Letters Patent, is:

1. A tractor comprising a rigid platform, a treader frame having a flat deck adapted to contact with said platform substantially throughout its surface, a pivotal connection between said platform and said deck and means between the platform and the deck for keeping them in contact.

2. A tractor comprising a rigid platform, a treader-frame having a flat deck adapted to contact with said platform substantially throughout its surface, a pivotal connection between said platform and said deck adjacent one end of the latter and means between the platform and the deck for keeping them in contact.

3. A tractor comprising a rigid platform, a treader-frame having a flat deck adapted to contact with said platform substantially throughout its surface, a pivotal connection between said platform and said deck adjacent one end of the latter and tongue and groove mechanism between the platform and the deck for admitting of relative pivotal motion therebetween, but preventing separation of the contacting surfaces.

4. A tractor comprising a rigid platform, a treader-frame having a flat deck adapted to contact with said platform substantially throughout its surface, a pivotal connection between said platform and said deck adjacent one end of the latter, the deck having a circular edge, and a circular guide on the platform for receiving said circular edge.

5. A tractor comprising a rigid platform, a treader-frame having a flat deck adapted to contact with said platform substantially throughout its surface, a pivotal connection between said platform and said deck, gear mechanism on the platform and gear mechanism mounted on the deck adapted to continuously coöperate when the treader frame has pivotal motion relatively to the platform.

6. A tractor comprising a rigid platform, a treader frame having a flat deck adapted to contact with said platform substantially throughout its surface, a pivotal connection between said platform and said deck, gear mechanism on the platform adapted to be connected with a power shaft and gear mechanism mounted on the deck adapted to transmit the power to the treader frame, said gear mechanism on the plaftorm and the deck being so related as to continuously transmit motion when the treader frame has pivotal motion relatively to the platform.

7. A tractor comprising a rigid platform, two treader frames, one pivoted at each end of the platform, a flat deck on each of said treader frames adapted to contact with said platform substantially throughout its surface and means on the platform intermediate the treader frames for keeping the decks in contact with the platform.

8. A tractor comprising a rigid platform, two treader frames, one pivoted at each end of the platform, a flat deck on each of said treader frames adapted to contact with said platform substantially throughout its surface and a guide member on the platform adapted to guide both of said decks in a single plane.

9. A tractor comprising a rigid platform, two treader frames, one pivoted at each end of the platform, a flat deck on each of said treader frames adapted to contact with said platform substantially throughout its surface, a guide member on the platform adapted to guide both of said decks in a single plane and means on the platform for simultaneously rotating the treader frames about their pivots.

10. A tractor comprising a rigid platform, two treader-frames pivoted on said platform, a rotatable screw mounted on said platform between said treader-frames, a nut on said screw and arms connecting the nut with the frames.

11. A tractor comprising a rigid platform, two treader-frames pivoted on said platform, a rotatable screw mounted on said platform between said treader-frames, a nut on said screw, arms connecting said nut with the frames and means intermediate the frames for guiding corresponding parts of both frames in a single plane.

12. A tractor comprising a rigid platform, two treader frames pivoted to the platform, gear mechanism mounted on the treader frames above the platform adapted to receive motion from a power shaft, gear mechanism on the platform coöperating with the first mentioned gear mechanism for transmitting motion to the treader frame, said gear mechanisms being so related as to continuously coöperate when the treader frames have pivotal motion relatively to the platform.

13. A tractor comprising a rigid platform, two treader frames, pivots on the treader frames extending through the platform, gear mechanism on said pivots above the platform adapted to receive motion from a power shaft, gear mechanism on said platform adapted to continuously coöperate with the first mentioned gear mechanism when the treader frames have pivotal motion relatively to the platform and to transmit motion to the treader frame.

14. A tractor comprising a rigid platform, two treader frames, pivots on said frames extending through the platform, two bevel gears mounted on each pivot, one adapted to receive motion from a power shaft, a line shaft, a bevel gear on said line shaft adapted to coöperate with the second of said bevel gears on each pivot and gear mechanism for transmitting motion from said line shaft to the treader frames.

15. A tractor comprising a rigid platform, two treader frames, a pivot on each frame extending through the platform near the opposite ends thereof, gear mechanism mounted on each pivot, a power shaft to drive said gearing, a housing about said gearing, a line shaft pivotally mounted on said housing at right angles to its axis and concentrically with each pivot and gearing mounted on both sides of the treader frames adapted to be driven by said line shaft and to transmit motion to the treader frames.

16. A tractor comprising a rigid platform, two treader frames, each having a flat deck adapted to contact with said platform substantially throughout its surface, a pivot on each treader-frame extending through the platform, means between the treader-frames for keeping the surfaces in contact, means for rotating the treader-frames simultaneously about their pivots, gearing on the pivots adapted to be driven by a power shaft, a line shaft mounted on a pivot at right angles to its axis and concentrically with said pivotal gearing on said line shaft adapted to engage the first mentioned gearing and adapted to transmit motion to the treader frames.

17. A tractor comprising a supporting frame, two independently operated jointed endless driving treaders each pivoted at the same relative part of their outer end portions to the opposite end portions of said frame in end to end alinement with each other, and in the longitudinal center of said frame, a threaded nut supporting rod connected to the adjacent ends of said endless driving treaders, means operable from said frame for rotating said threaded rod to move the ends of said treaders in unison on either side of the longitudinal center of said frame, and means including a motor and gearing carried by said frame and connected to said treaders for propelling said driving treaders.

18. A tractor comprising a supporting frame, two independently mounted endless driving tracks pivoted at any predetermined but at the same relative part of their outer end portions to the opposite end portions of said frame in end to end alinement with each other and in the longitudinal center of said frame, means including a threaded nut supporting rod connected to the adjacent ends of said endless driving track, means operable from said frame for rotating said threaded rod to move the ends of said tracks in unison on either side of the longitudinal center of said frame, and means including a motor and a duplex system of motors track driving and brake control, and two oppositely facing but alined seats arranged on opposite sides of the central portions of said frame, driving tracks, and said duplex system of control for operatively turning said driving tracks under said frame in lateral and longitudinal planes on either side of the longitudinal center of said frame, and for operatively propelling said driving tracks.

19. A tractor comprising a frame and two propelling endless tracks, which are pivotally connected at their farthest opposite end portions from their adjacent ends to the opposite end portions of the under side of said frame in end to end alinement, and arranged and adapted to be swung laterally and horizontally underneath said frame in either direction from the longitudinal central plane of the pivotal connections of said tracks with said frame, means for independently propelling each track and for swinging the adjoining ends of said driving tracks together and in the same direction and in unison with each other on either side of the longitudinal center of said frame and independently of it, a power generating motor on said frame, two adjacent but oppositely facing operator's seats at the central portion of said frame, and a double or duplex system of control reachable and operable from either seat for steering, propelling, and braking the propelling mechanism of said tractor.

20. A tractor, comprising a frame having an independently operating pair of endless driving tracks, each of which is pivotally connected at any predetermined point intermediate of their ends to the under side of said frame in end to end alinement, and means including a reciprocating member for swinging the free ends of said tracks laterally and horizontally under said frame on either side of its longitudinal center through the center of its pivotal connections with said tracks, two seats on said frame arranged to face each other, a motor on said frame, and a dual system of motor and track control connecting said motor to said tracks and operable from either seat.

21. A tractor comprising a supporting frame, two independently operated endless driving tracks pivoted at any predetermined but at the same relative part of their outer end portions to the opposite end portions of said frame in end to end alinement with each other and in the longitudinal center of said frame, means including a threaded nut supporting rod connected to the adjacent ends of said endless driving track, means operable from said frame for rotating said threaded rod to move the ends of said tracks in unison on either side of the longitudinal center of said frame, and means including a motor and a duplex system of motors track driving and brake control, and two oppositely facing but alined seats arranged on opposite sides of the central portions of said frame, driving tracks and said duplex system of control for operatively turning said driving tracks under said frame in lateral and longitudinal planes of either side of the longitudinal center of said frame, and for operatively propelling said driving tracks, said seats being both positioned on one side of the longitudinal center of said frame and said duplex controlling system being arranged to be operated from either seat by the right hand and right foot of said operator.

22. A tractor comprising a frame and two propelling endless tracks, which are pivotally connected at their farthest opposite end portions from their adjacent ends to the opposite end portions of the under side of said frame in end to end alinement, and arranged and adapted to be swung laterally and horizontally underneath said frame in either direction from the longitudinal central plane of the pivotal connections of said tracks with said frame, means including a friction clutch mechanism for independently propelling each track and means for swinging the adjoining ends of said driving tracks together and in the same direction synchronically on either side of the longitudinal center of said frame and independently of it, a power generating motor on said frame, two adjacent but oppositely facing operator's seats at the central portion of said frame, and a double or duplex system of control reachable and operable from either seat for steering, propelling and braking the operating mechanism of said tractor, the opposite ends of said frame and tracks being of like construction and arrangement whereby either end is either the front or rear end depending on which end is moving forward, and said operator always faces the direction the machine is traveling and when he reverses the direction of movement of the machine he changes his position to the opposite seat from the one he has been occupying and thus changes his position and faces the way he has reversed the tractor to move in.

23. A tractor comprising a horizontally arranged stationary platform frame pivotally supported upon two endless ground treading tracks positioned at the opposite end of said frame's longitudinal axis at any predetermined points equi-distant from its transverse center, means including power producing motor and power transmission driving and controlling mechanism mounted on said frame and arranged to form operative connections between said motor and each of said endless ground treading traction driving tracks, means for swinging the track driving frames, beneath the main frame, in arcs of circles on their pivotal connections with said main frame, in a horizontal plane thereto, together in synchronous unison, whereby said tractor is propelled and steered and controlled.

24. In a tractor, two endless ground treading traction tracks provided with a supporting frame, a stationary platform frame provided with two apertures positioned one at each of its opposite end portions, a pivotal hub-casting secured to each of said track supporting frames pivotally mounted in each of the apertures of said frame, each of said hub-castings being provided with a vertical axle portion adapted to form a pivotal axle head member at each end of the stationary frame, and means including gearing rotatably mounted on said hub-casting, a cylindrical oil holding drum bearing at its lower end on said stationary platform frame and mounted on each of said hub-castings at one end and suitably supported at its opposite end to the adjacent housing members of said track's supporting frame, whereby said stationary platform frame is supported on and over said endless treading traction tracks and said tracks are pivotally connected to said stationary frame, and are adapted to be swung horizontally underneath said frame on either side of its longitudinal center.

25. In a tractor, the combination of the stationary frame provided with a pivotal swinging hub-casting at its opposite end portions, a gear casting provided with two gears of different diameters rotatably mounted on each of said hub-castings, a brake band wheel rotatably mounted on said hub-casting, a deck plate rigidly secured to said hub-casting, operative endless ground treading track mechanism secured to said deck plate, and means for turning said deck plate and said tractor driving tracks on said pivotal hub-casting independently of said stationary frame.

26. In a tractor, the combination of the stationary platform frame having a pivotal aperture positioned at a predetermined point in its opposite end portions, and a pair of endless ground treading traction tracks pivotally secured to said stationary frame to swing laterally underneath the same, each of said tracks comprising a supporting frame provided with a plurality of shafts at each end, and in their lower central portions a plurality of alined belt supporting and driving wheels mounted on said shafts, a plurality of endless link belts of suitable construction operatively mounted on each pair of alined wheels, and suitable ground treads extending transversely across and secured to said plurality of endless belts, a hub axle casting on each of said track supporting frames, rotatably journaled in each of the circular pivotal apertures of said stationary frame, whereby each of said track supporting frames is pivotally mounted to swing underneath said stationary frame, and means including a motor and controlling mechanism and including gearing mounted on said hub-axle casting for operatively propelling and steering said endless tractor driving tracks.

27. In a tractor, the combination of the platform with endless traction tracks arranged to be swung underneath said platform, two seats on said platform arranged to face each other and to face toward the opposite ends of said frame, a motor mounted on said frame and controllably operated from either seat, and means for propelling and steering said endless traction tracks from said seats.

28. In a tractor, the combination of the platform and the two jointed, endless traction treaders, pivotally connected to said frame to swing underneath the same, a threaded rod journaled between the adjacent ends of said treaders, a nut threaded upon said threaded rod, links pivotally connected at one end to said nut and at their opposite ends to the adjoining ends of said treaders whereby said nut is held from turning, an operating device on said platform, and having connection with said threaded rod for rotating the same whereby said nut is caused to move along said rod and the adjoining ends of said treaders are moved together with and by said nut.

29. In a tractor, the combination with the stationary frame of the endless tractor tracks swingingly pivoted to the under side of said frame, each of said tracks comprising a supporting frame provided with a plurality of wheel supporting shafts, suitable chain supporting wheels and rollers mounted on said shafts, an endless chain mounted on said wheels and rollers, said chain being composed of overlapping links pivotally connected together and so arranged as to run on said wheels and rollers, ground treading shoes secured removably to said chain, and means mounted on said platform, including a motor and connected to said motor and track for propelling and steering the same.

30. In a tractor, the combination of the stationary frame and two endless traction tracks, each of said tracks comprising a suitable traction track supporting frame provided with a plurality of sets of chain supporting wheels, each set of wheels consisting of several wheels arranged in chain alinement on said shafts, the wheels of each set being arranged to support and drive an endless track chain.

31. In a tractor, a suitable traction track supporting frame provided with a plurality of sets of chain supporting wheels, each set of wheels consisting of several wheels arranged in chain alinement on said shafts, the wheels of each set being arranged to support and drive an endless track chain, a track chain mounted on each set of chain supporting wheels, each of said chains comprising a plurality of short overlapping links pivotally connected together by a plurality of bolts that extend transversely through all of the chains of each set, each of said link pivoting and connecting bolts being provided with an oil reservoir arranged to distribute oil to the pivotal joints of the links, and ground engaging shoe treads removably secured to said chains at short distances apart, said shoes being arranged to extend transversely across all of said chains of each set.

32. In a tractor, the combination of a traction track frame comprising the deck plate, T beams and boxes, with the roller wheels in the central portion of the frame, smooth faced chain supporting wheels at one end of said frame, and toothed sprocket wheels at the opposite end of said traction track frame.

33. In a tractor, the combination of a traction track frame comprising the deck plate, T beams and boxes, shafts that support the endless chain supporting wheels, and chain supporting wheels mounted thereon.

34. In a tractor, the combination of a traction track frame comprising a deck plate, T beams and boxes, shafts that support the endless chain supporting wheels, chain supporting wheels mounted thereon, with a plurality of endless track chains each of which comprises a plurality of overlapping links adapted to run over and fit said wheels, said chains being arranged side by side on said wheels of said shafts, a pivotal pin extending transversely through each pair of pivotal joints of said links of all of the links in the same transverse plane, means for oiling said joints, and means for propelling said chains.

35. In a tractor, the combination of a traction track frame comprising the deck plate, T beams and boxes, shafts that support the endless chain supporting wheels, chain supporting wheels mounted thereon, with a plurality of endless track chains each of which comprises a plurality of overlapping links adapted to run over and fit said wheels, said chains being arranged side by side on said wheels of said shafts, a pivotal pin extending transversely through each pair of pivotal joints of said links of all of the links in the same transverse plane, means for oiling said joints, means for propelling said chains, said pivotal pins being provided with an axial oil reservoir, and means for filling said oil reservoirs and distributing oil from said oil reservoirs.

36. A tractor comprising a main frame, treader-frames oscillatively connected to said main frame, endless ground-treaders carried by said treader-frames, means for oscillating said treader-frames, means for driving said treaders, and means for braking said tractor.

37. In a tractor, the combination of a track-supporting frame, two jointed, endless tracks arranged end to end and in alinement, each of said tracks comprising a plurality of endless, link-belt chains spaced apart and parallel with one another, and means for driving said tracks.

38. A two-part tractor comprising a main frame, a pair of separate treader-frames carried by said main frame, and ground-treaders in longitudinal alinement on said treader-frames, said treader-frames and treaders being substantially duplicates and affording a tractor operable as forward in either direction.

39. In a tractor, the combination of the traction track frame comprising the deck plate, T beams and the boxes, shafts that support the endless chain supporting wheels, chain supporting wheels mounted thereon, with a plurality of endless track chains each of which comprises a plurality of overlapping links adapted to run over and fit said wheels, said chains being arranged side by side on said wheels of said shafts, a pivotal pin extending transversely through each pair of pivotal joints of said links of all of the links in the same transverse plane, means for oiling said joints, means for propelling said chains, said pivotal pins being provided with an axial oil aperture, means for filling said oil reservoirs and distributing oil from said oil reservoirs, and ground tread members comprising corrugated plates arranged to extend transversely across all the chains and removably secured to each of the alined links of each chain.

40. In a tractor, the combination of a stationary platform frame, two traction driving tracks positioned one at each end of said frame, a motor mounted on said frame centrally of its length, having a crank axle provided with a fly wheel clutch at each of its opposite ends, two main driving shafts rotatively mounted on said stationary platform on each side of said motor, and having their inner ends provided with sliding clutches adapted to be moved into and out of engagement with said fly wheel clutches of said crank axle, means for operating said clutches, means including clutch controlled gearing for starting and stopping said main driving shafts, and means including gearing arranged to connect said main driving shafts with said tracks for propelling the same, said means being arranged to connect said clutch controlled gearing with said traction tracks.

41. In a tractor, the combination of the stationary platform frame, two endless traction driving tracks, one of each of which is pivotally mounted to the opposite end portions of said stationary frame to be moved laterally of its center in either direction, a motor mounted on said platform, of two clutch controlled driving shafts extending along the said platform from opposite ends of said motor and operatively journaled on said platform, two clutch controlled opposing faced bevel pinions mounted on each of said main shafts, a bevel gear journaled on each of the opposite ends of said platform in sliding clutch alternatingly engaging relation with each of said pair of pinions on each main shaft, and means including gearing for connecting said bevel gears at each end of said frame to its adjacent traction driving track.

42. In a tractor, the combination of a stationary platform arranged so that either end is its front end when moving forward in either direction, endless, jointed traction tracks swingingly connected to said platform to move laterally underneath said platform, and means for propelling and steering said tractor tracks from said platform.

43. In a tractor, the combination of the stationary platform arranged so that either end is its front end when moving forward in either direction, traction tracks swingingly connected to said platform to move laterally underneath said platform, and means for propelling and steering said traction tracks from said platform, said propelling means comprising a motor of any suitable type operatively connected to said tracks and said steering means comprising a duplicate pair of seats mounted on said platform and facing each other and facing in opposite directions.

44. In a tractor, the combination of the stationary platform arranged so that either end is its front end when moving forward in either direction, traction tracks swingingly connected to said platform to move laterally underneath said platform, means for propelling and steering said traction tracks from said platform, said propelling means comprising a motor of any suitable type operatively connected to said tracks and said steering means comprising a duplicate pair of seats mounted on said platform and facing each other and facing in opposite directions, a foot operating pedal for and within reach of each seat, a hand lever adjacent to each seat and so arranged that either lever can be reached from its adjacent seat and be operated by the right hand of the operator seated in said lever's seat.

45. In a tractor, the combination of the stationary platform arranged so that either end is its front end when moving forward in either direction, traction tracks swingingly connected to said platform to move laterally underneath said platform, means for propelling and steering said traction tracks from said platform, said propelling means comprising a motor of any suitable type operatively connected to said tracks and said steering means comprising a duplicate pair of seats mounted on said platform and facing each other and facing in opposite directions, a foot operating pedal for and within reach of each seat, a hand lever adjacent to each seat and so arranged that either lever can be reached from its adjacent seat and be operated by the right hand of the operator seated in said lever's seat, and means including levers connecting said hand levers and pedals with said tracks for steering the same whereby said traction tracks are propelled and steered, and their direction of movement is reversed from said platform by an operator sitting in either one of said seats and operating the adjacent pedal and foot lever, and said operator by changing his position from one seat to the other can always face the direction the tractor is moving in when he reverses its direction of movement.

46. In a tractor, the combination of the stationary platform and the endless traction tracks, duplicate and opposite arrangement of the operator's seats and the two hand operating levers and foot pedals, each hand lever and its coöperating foot pedal being arranged to move in synchronous unison with the hand lever and pedal of the opposite seat, both hand levers being operable from their adjacent seat by the operator's right hand and means including a suitable motor for propelling, steering and controlling said traction tracks from the two opposite seats of said stationary platform.

47. In a tractor, the combination of a stationary platform, endless traction tracks, duplicate and opposite arrangement of the operator's seats and the two hand operating levers and foot pedals, each hand lever and its coöperating foot pedal being arranged to move in synchronous unison with the hand lever and pedal of the opposite seat, both hand levers being operable from their adjacent seat by the operator's right hand, means including a steering wheel mechanism within reach of either seat and a reciprocating mechanism connected to said traction tracks whereby they are swung laterally underneath said stationary platform in unison, means whereby a brake band and a system of levers connect said hand levers and foot pedals with said track swinging mechanism and with said brake band, and means including a suitable motor for propelling, steering and controlling said traction tracks from the two opposite seats of said stationary platform.

48. In a tractor, the combination of stationary platform, two traction tracks pivotally connected to said platform and provided with means for swinging their adjoining inner ends laterally underneath said platform, two oppositely positioned seats at the central portion of the length of said stationary platform, two opposingly arranged foot levers within foot reach from said seats, two hand operating levers arranged within reach of either of said seats, said seats and levers being so relatively arranged that the operator can operate either lever from its adjacent seat with his right hand, whereby the operator when driving the tractor ahead in the direction he is facing when sitting in one seat and operating its adjacent lever can change his position to the opposing seat and operate its adjacent lever with the same hand he used on the other lever, reverse the direction of propelling movement of the tractor, and be facing the reversed direction in which the tractor is moving, and means including a suitable motor, a steering mechanism and combination of levers connected to said foot pedals, operating levers and to said traction tracks swinging mechanism for operatively propelling, steering and controlling said tractor's tracks from said seats by said levers and foot pedals.

49. In a tractor of the character described, the combination with power driven fly wheels having clutch members, of driving shafts slidable in and rotatable with said clutch members, oppositely arranged foot lever operated shafts, means connecting the same with said clutches whereby they may be disengaged from the fly wheels, oppositely arranged hand lever operated shafts, means connected therewith for sliding said driving shafts endwise in either direction, means connecting said hand levers whereby the movement of one effects a corresponding movement of the other, and means connecting the foot levers whereby the movement of one effects a corresponding movement of the other.

50. In a tractor of the character described, the combination with alined power driven fly wheels and clutches carried thereby, of driving shafts, the opposing ends of which are slidable in and rotatable with said clutches, rock levers connected with said clutches, a clutch operating shaft, a double ended crank arm on said shaft and rods connecting said rock arms and said double ended crank arm, oppositely arranged foot lever operated shafts, means connecting them with said clutch operating shaft, means connecting said foot lever shafts whereby the movement of one effects a corresponding movement of the other, a tubular shaft surrounding the clutch operating shaft, hand lever operated shafts, means connected therewith for actuating the tubular shaft, a crank arm on said tubular shaft means connecting the same with the driving shafts, whereby the said shafts may be moved endwise in either direction, and means connecting the hand lever operated shafts, whereby the movement of one effects a corresponding movement of the other.

51. In a tractor of the character described, the combination with alined power driven fly wheels and clutches carried and operated thereby, of driving shafts the opposing ends of which are slidable in but rotatable with said clutches, rock arms for disconnecting said clutches from said fly wheels, a clutch operating shaft, a double crank arm thereon, and rods connecting said rock arms with the ends of said double crank arm, a tubular shaft surrounding the clutch operating shaft, a crank arm thereon, a longitudinal bar, a link connection between the crank arm and the said bar, means connecting the ends of said bar with said driving shafts, oppositely arranged foot lever operated shafts, means connecting them with the clutch operating shaft, means connecting the foot lever operated shafts so that the movement of one effects a corresponding but opposite movement of the other, oppositely arranged hand lever operated shafts, means connecting them with the said tubular shaft, and means connecting the hand lever operated shafts so that the movement of one effects a corresponding movement of the other in the same direction.

52. In a tractor of the character described, the combination with alined power driven fly wheels and clutches carried thereby, of driving shafts, the opposing ends of which are slidable in but rotatable with said clutches, collars rigidly mounted on said shafts, rings rotatable on said collars, a longitudinal shifting bar and arms connecting said rings and the ends of said bar, a tubular shaft, a crank arm on the inner end thereof, a link connecting said bar and said crank arm, oppositely arranged hand lever operated shafts, crank arms on said shafts, a crank arm on the inner end of the said tubular shaft, a rod connecting said latter crank arm and the crank arm on one of said hand lever operated shafts, a link connecting the crank arm on the inner end of the tubular shaft and the crank arm on the other hand lever operated shaft, tubular foot lever operated shafts surrounding the hand lever operated shafts having crank levers thereon, a clutch operating shaft rotatably mounted in the shifting lever operating shaft having a double crank arm on its inner end and a combined crank and locking arm on its outer end, a link connecting the combined crank and locking arm with the crank arm on one of the foot lever operated shafts, a rod connecting the combined crank and locking arm with the other foot lever operated shaft, rock arms for disconnecting said clutches from the fly wheels, rods connecting said rock arms with the double crank arms on said clutch operating shaft, and a sector on the crank arm of one of said hand lever operated shafts which is adapted to be engaged by the end of said combined crank and locking arm.

53. In a tractor of the character described, the combination with alined power driven fly wheels, clutches carried and operated thereby, brake rings, a power receiving gear and a power transmitting gear on said rings, and alined pinions in mesh with each power receiving gear having clutches on their opposing ends, of alined driving shafts whose opposing ends are slidably mounted in the fly wheel clutches but rotatable therewith, their opposite ends extending loosely through the alined pinions, of the respective power receiving gears, pairs of clutches on each shaft adapted to engage the respective pairs of pinion clutches, means for shifting the shafts in unison and in the same direction so that one clutch on each shaft will engage one of the pinion clutches of the adjacent pair of pinions, means for disconnecting the fly wheel clutches from the said fly wheels, brake bands on said brake rings, and means operated by the fly wheel clutch releasing means for applying and releasing said brake bands.

54. In a tractor, a plurality of endless traction-tracks arranged in end to end alinement, each of said tracks comprising an endless ground-treading belt, roller supports for said belts, and means for propelling said belts on said roller supports.

55. In a tractor, a plurality of separate endless traction-tracks arranged in end to end alinement, each having an endless ground-treading belt, roller supports for said belts, means for driving said belts, means for simultaneously controlling the driving of the belts, and means for steering the tractor.

56. In a tractor, a stationary mechanism supporting platform, two ground treading traction track members pivotally connected to said stationary platform in end to end alinement, means connected to said platform for reciprocally swinging said endless ground treading tracks in arcs of circles laterally of said platform's longitudinal central axis through the pivotal connections of said tracks therewith, each of said endless ground treading tracks comprising an endless ground treading belt, of any suitable construction, means including a suitable track for operatively supporting said endless ground treading belt, means including a suitable motor mounted on said platform for rotatively propelling said endless ground treading track from said platform on said track, and means for steering and controlling said traction track from said platform.

57. In a tractor of the character described, the combination with a platform, alined power driven fly wheels mounted thereon, and friction clutches engaged thereby, of alined shafts, the opposing ends of which are slidable in but rotatable with said clutches, track frames pivoted to the opposite ends of said platform, endless tracks mounted on said frames, a pair of oppositely arranged pinions through which the outer end of each shaft passes, and clutches on each of said shafts for engaging one or the other of the adjacent pair of pinions, gear wheels in mesh with each pair of pinions and gearing connecting said pinion operated gears with the endless tracks, oppositely arranged hand lever operated shafts, means including levers for connecting them with the said alined shafts, means connecting the hand lever operated shafts whereby the movement of one effects a corresponding movement of the other, levers for disconnecting the clutches from the fly wheels, foot lever operated shafts, and means connecting them with the clutch operating levers, brake rings on the pinion operated gears, brake bands surrounding said brake rings, double acting levers connected to the ends of each brake band, and flexible means connecting said double acting levers with the clutch operating levers.

58. In a tractor of the character described, the combination with a platform, of track carrying frames pivotally connected to the opposite ends thereof, rollers supported in said frames, endless tracks mounted on said rollers, means for maintaining the required tension of said endless tracks, and means for swinging the opposing ends of said track simultaneously and in the same direction.

59. In a tractor of the character described, the combination with a platform, of track carrying frames pivotally connected to the opposite ends thereof, shafts mounted in the outer end of each frame and sprocket wheels thereon, boxes slidably mounted in the opposing ends of each frame, shafts mounted thereon having supporting rollers and endless tracks extending around said sprocket wheels and said supporting rollers, means for securing the slidable boxes at the required point of adjustment whereby to maintain the required tension upon the endless tracks and intermediate shafts in said frames having track supporting rollers.

60. In a tractor of the character described, the combination with the stationary platform of an endless ground treading traction track, said track being provided with a supporting frame having a pivotal hub portion projecting rotatively through said platform, and means connected with said platform for pivotally securing said hub to said platform whereby said track and its pivotally supporting frame are connected to said platform, and means including a steering wheel mounted on said platform and operatively connected to said track mechanism for laterally swinging said track mechanism underneath said platform laterally of said platform's longitudinal center.

61. A two-part tractor comprising a main frame, a pair of separate treader-frames carried by said main frame in longitudinal alinement, ground-treaders on said treader-frames, means for driving said treaders, separate transmission-mechanism for each of said treaders, oppositely-facing seats on said main frame, and connected means adjacent said seats for simultaneously controlling said transmission-mechanism, said treader-frames and treaders being substantially duplicates and affording a tractor operable as forward in either direction.

62. In a tractor device the combination of a treader-frame comprising side walls, a deck covering said walls and a jointed endless ground treader substantially filling the space between said walls.

63. In a tractor device the combination of a treader-frame comprising side walls and a deck covering said walls, a jointed endless ground treader substantially filling the space between the walls, a plurality of shafts carried by the side walls and a plurality of carriers on each shaft for operatively supporting the treader.

64. In a tractor device the combination of a treader frame comprising side walls and a deck covering said walls, a jointed endless ground treader substantially filling the space between the walls, mechanism at one end of the treader frame and treader for driving the treader, mechanism at the other end for suitably supporting and guiding the treader and runners at the lower edge of the side walls and intermediate the driving and supporting mechanism to support the treader frame along the treader track.

65. In a tractor device the combination of a treader frame of a box-like structure comprising side walls and a deck, a driving shaft and tractor wheels thereon intermediate the walls, said shaft being located near one end of the treader frame, a second shaft and wheels thereon located near the other end of the treader frame, a jointed endless ground-treader supported on said wheels and driven by the tractor wheel, the treader filling substantially the space between the said side walls and forming an extended horizontal track.

66. In a tractor device the combination of a jointed endless ground treader of substantially the width of a truck, a substantially box-like frame having a deck and side walls and adapted to receive the treader, a tractor wheel and a guide wheel for the treader at opposite ends of the frame of such size and form that the treader presents an extended horizontal surface to the ground, forming a track, and a plurality of runners at the lower edge of the side walls intermediate the tractor and guide wheels to support the frame along said track.

In testimony whereof I affix my signature in presence of two witnesses.

JOHN GEORGE LEYNER.

Witnesses:
G. SARGENT ELLIOTT,
ADELLA M. FOWLE.